United States Patent
You et al.

(10) Patent No.: US 12,259,916 B1
(45) Date of Patent: Mar. 25, 2025

(54) ENHANCED SEARCH AUTOCOMPLETION FRAMEWORK

(71) Applicant: Amazon Technologies, Inc., Seattle, WA (US)

(72) Inventors: Liwen You, San Jose, CA (US); V Divya Bhargavi, Atlanta, GA (US)

(73) Assignee: Amazon Technologies, Inc., Seattle, WA (US)

( * ) Notice: Subject to any disclaimer, the term of this patent is extended or adjusted under 35 U.S.C. 154(b) by 11 days.

(21) Appl. No.: 18/331,468

(22) Filed: Jun. 8, 2023

(51) Int. Cl.
*G06F 16/33* (2019.01)
*G06F 16/334* (2025.01)
*G06F 16/338* (2019.01)

(52) U.S. Cl.
CPC ........ *G06F 16/3344* (2019.01); *G06F 16/338* (2019.01)

(58) Field of Classification Search
None
See application file for complete search history.

(56) References Cited

U.S. PATENT DOCUMENTS

| | | | |
|---|---|---|---|
| 11,106,690 B1 * | 8/2021 | Dhillon ................ | G06N 5/01 |
| 2020/0104427 A1 * | 4/2020 | Long .................... | G06N 3/04 |
| 2022/0121656 A1 * | 4/2022 | Zheng ............... | G06F 18/24133 |
| 2022/0342936 A1 * | 10/2022 | Li ...................... | G06F 16/9537 |
| 2024/0104091 A1 * | 3/2024 | Hamilton ............ | G06F 16/9535 |

FOREIGN PATENT DOCUMENTS

KR 20240069032 A * 5/2024 ......... G06F 16/3338

OTHER PUBLICATIONS

Dandagi, Vidya S., and Nandini Sidnal. "Query Auto-Completion Using Graphs." In Congress on Intelligent Systems: Proceedings of CIS 2020, vol. 2, pp. 453-465. Springer Singapore, 2021. (Year: 2021).*
Wang, Sida, Weiwei Guo, Huiji Gao, and Bo Long. "Efficient neural query auto completion." In Proceedings of the 29th ACM International Conference on Information & Knowledge Management, pp. 2797-2804. 2020. (Year: 2020).*

* cited by examiner

*Primary Examiner* — Tony Mahmoudi
*Assistant Examiner* — Umar Mian
(74) *Attorney, Agent, or Firm* — Lee & Hayes, P.C.

(57) ABSTRACT

Systems and techniques are disclosed for determining relevant search query autocompletions for presentation to a user that has entered a prefix into a search application interface. A target search space represented as a knowledge graph may be searched to generate a subgraph of nodes representing autocompletion candidates that correspond to the prefix. Further historical and/or interaction data associated with the user and/or other users of the search application may be used to detemir additional autocompletion candidates. A machine-learned model may be trained to score and rank the candidates based on embeddings extracted by the model for the autocompletion candidates. A listing of the autocompletion candidate ordered based on the scores may be presented as autocompletion suggestions to the user.

20 Claims, 10 Drawing Sheets

ENHANCED SEARCH AUTOCOMPLETION FRAMEWORK

BACKGROUND

Computer networks allow users to access many different systems and devices from a single user device. Many such networks are quite large and connect many devices and systems (e.g., the Internet, networks maintained by large organizations, cloud-based storage systems, etc.), providing access to numerous files and other forms of data storage. Locating files and other data objects in such systems is often performed using a search application (e.g., a search engine) that accepts user text input that the search application may use to locate files or data objects containing content that matches or is similar in some way to the user text input.

Modern search applications may provide an autocompletion function, where the application provides suggestions for search terms as a user inputs text into a search input control (e.g., text box). This is typically accomplished by a simple matching of the input text with words or phrases that begin with the input text. The matching words or phrases may be selected from common or popular words and phrases that the search application has stored for autocompletion purposes. However, such common and/or popular words and phrases may not be relevant to the user currently inputting text into the search application. Moreover, these common and/or popular words and phrases may not be associated with available content, especially in systems with a relatively small universe of available content, such as a streaming media content system.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
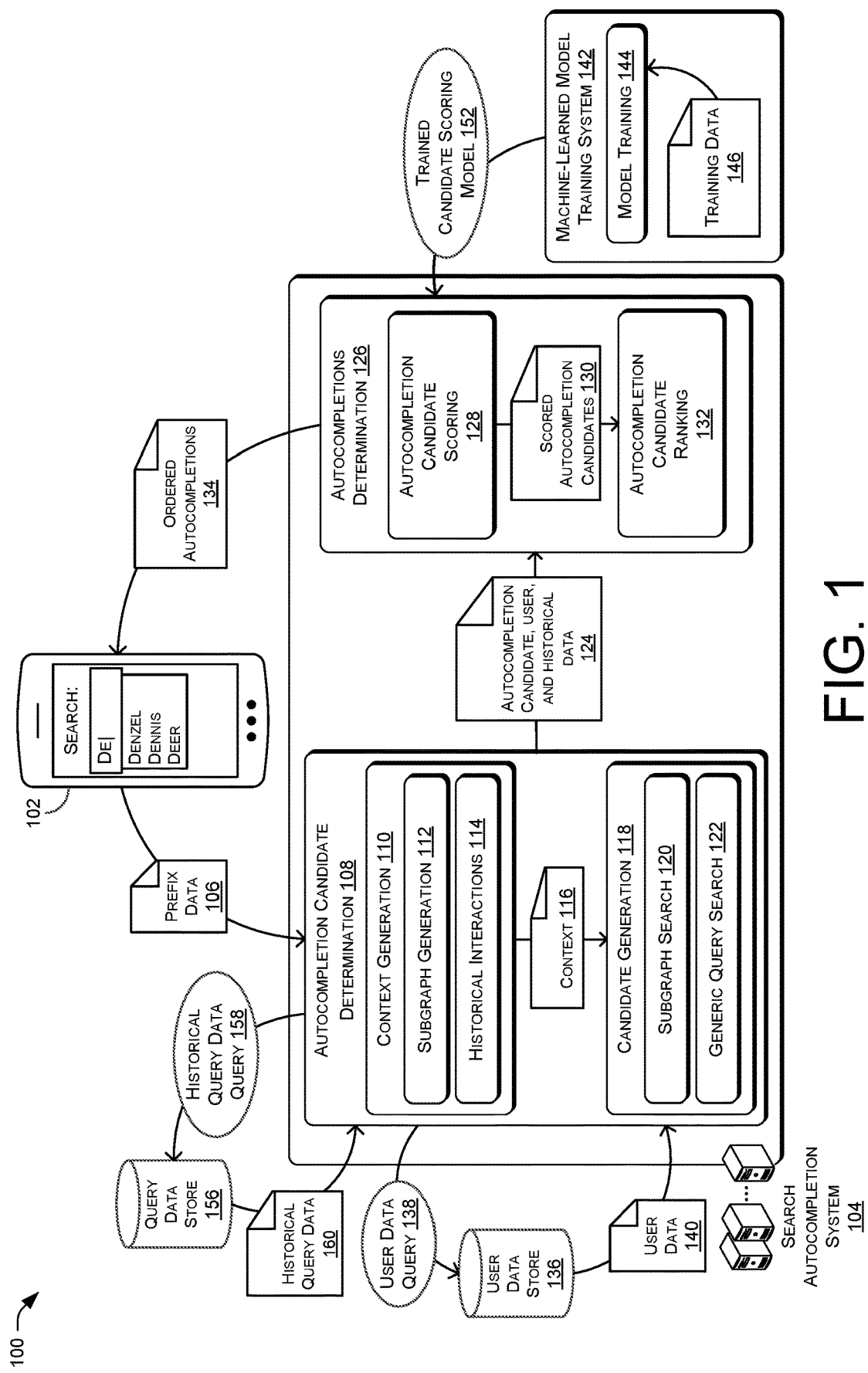
FIG. 1 illustrates a system-architecture diagram of an example environment in which an enhanced search autocompletion framework may be implemented.

An enhanced search autocompletion framework may be used in, or in conjunction with, a search application to provide one or more suggested search terms (e.g., words or phrases) to a user based on some initial user input. For example, a user may begin typing in a search input control or field (e.g., a text box) configured at the search application user interface. Based on the character(s) entered by the user, the search application may use the framework described herein to determine one or more suggested search inputs for the user. Search input may take the form of one or more characters, words (strings of characters), and/or phrases. The disclosed systems and techniques incorporate information about a target search space and/or a user performing a search into the autocompletion determination operations to improve the quality of suggested search inputs provided to a user. The various autocompletion determination operations described herein may use exact and/or semantic matches, context matches, and personalization matches to generate intermediate data structures that may then be processed to determine autocompletion candidates. These candidates may be scored based on various criteria and ranked based on their respective scores. A list of autocompletion candidates ordered based on associated scores may then be provided to a user for selection in a search interface.

In some conventional systems, a search application may simply match the characters entered thus far to one or more search terms that may be common or popular. In other conventional systems, various semantic and/or elastic search operations may be performed to determine suggested search input. However, these conventional approaches do not allow for the customization of suggested search inputs for a particular user based on user history and/or associated contextual data. Such conventional approaches also do not take into account the potentially comprehensive and complementary information that may be available for a target search space to improve search input suggestions and help ensure that such suggestions are associated with content that actually exists in the target search space.

A system implementing an enhanced search autocompletion framework may receive (e.g., data indicating) one or more characters entered at a search interface. These one or more characters may be referred to as a "prefix" herein and may include any combination of any one or more characters, words, phrases, etc. (e.g., "de," "abs," "12," "john w," etc.).

Receipt of a prefix may trigger an initiation of the autocompletion determination operations described herein.

Based on the received prefix, the system may match the prefix to data in a target search space. In various examples, the data in a target search space may be represented as a catalog of data or content. Such a catalog may be represented in a knowledge graph (e.g., in one or more data structures representing a knowledge graph). The nodes in such a knowledge graph may include or otherwise be associated with particular pieces of content, data files, or other data objects of any type that may include data that may be searchable (referred to herein generally as "node content"). The nodes may further include metadata that may be associated with node content (referred to herein generally as "node metadata"). For example, node metadata may include contextual information about the node content (e.g., source, studio, owner, author, genre, duration, participants (e.g., actors, musicians, performers, etc.), etc.), technical information about the node content (e.g., format, encryption, error-checking data, etc.), and/or any other data associated with node content. Nodes in the knowledge graph may be connected by links that are based on an association between the linked nodes. For example, nodes that are associated with one or more of the same or similar attributes (that may be represented in node metadata) may be linked. For instance, nodes associated with content in the same genre, with the same actor(s), with the same author, with the same release timeframe, etc. may be linked. The links may be individually associated with the shared attribute.

The system may search the knowledge graph of the target search space using the prefix to identify any nodes that have node content and/or node metadata that matches the prefix. For instance, the system may determine node content names (e.g., titles) that include or start with the prefix (e.g., portions of which are an exact match with the prefix and/or a semantic match with the prefix). The system may also, or instead, determine node metadata (e.g., actors, directors, studios, date, etc.) that includes or starts with the prefix (portions of which are an exact match with the prefix and/or a semantic match with the prefix). The system may determine a subgraph of the target search space knowledge graph that includes those nodes that are associated with the match (e.g., context match, semantic match, exact match, etc.). The system may link the prefix-matching nodes in the subgraph.

To generate a richer universe of potential autocompletion candidates, the system may also determine one or more nodes that are linked in the catalog knowledge graph to one or more of the nodes extracted for the subgraph. For example, the system may identify one or more nodes that do not exactly match the prefix but are within a predetermined number of links of one or more (e.g., at least two) determined subgraph nodes that match the prefix. The system may add these knowledge graph nodes to the subgraph. The predetermined link count K used to identify contextual matching nodes may be determined based on a desired subgraph size. For example, a subgraph may be relatively small for a very specific or lengthy prefix and the system may therefore increase K to increase the number of nodes in the subgraph. Alternatively, a subgraph may be relatively large for a very general or short prefix and the system may therefore decrease K to reduce the number of nodes in the subgraph (e.g., to increase resource utilization efficiency and/or processing time).

The system may further search data associated with the user to determine potential candidate autocompletions. For example, the system may compare the prefix to past searches performed by the user to identify search terms that the user may have used in the past. Similarly, the system may compare the prefix to genres, user preferences, user consumption history, and/or any other user and/or historical interaction data that may be available. If the prefix is found to match any pieces of such data, that data may be included as potential autocompletion candidate data. Such a match may be referred to as a "personalized match." In examples, such personalized matches and the associated data may be added as nodes to the subgraph, while in other examples such data may be maintained in one or more other types of data structures.

The system may then determine autocompletion candidates from the determined potential autocompletion candidate data (e.g., the determined subgraph and/or personalized match data). In various examples, the system may use historical search queries received from other (e.g., all) users, for example for a particular timeframe (e.g., over the past day, week, month, etc.). The system may further use metadata associated with such search queries, such as data indicating whether the query resulted in a selection (e.g., "click") and/or consumption of particular content. The system may associate queries to nodes in the subgraph that share attributes of some kind. For example, the system may associate a query that resulted in a selection of a particular piece of content with a node in the subgraph associated with that piece of content. In examples, the system may further associate the query with one or more nodes linked to the node in the subgraph associated with that piece of content, for instance, within a predetermined number of links (e.g., number of links K that may be adjusted as described above). Such queries and/or the associated nodes may be included in the set of autocompletion candidates.

The system may also, or instead, determine autocompletion candidates from the determined potential autocompletion candidate data associated with personalized match data by determining a most common or popular set of historical search queries received from other (e.g., all) users and determining matches between such queries and personalized match data. For example, the system may determine that a user's content consumption history includes a particular piece of content associated with a query included in the most common or popular set of historical search queries. Based on this association (e.g., context match), the system may include this particular query as an autocompletion candidate. Other matches of personalized data to one or more historical search queries (e.g., common or popular historical search queries) may also be used to determine and/or further augment the autocompletion candidates.

The system may score autocompletion candidates to determine a ranking for such candidates. In examples, the scoring may be performed by one or more machine-learned models and/or pipelines including one or more machine-learned models as described in more detail here. In various examples, such scoring may be based on embedded data associated with a subgraph node, a candidate query, the prefix (e.g., the characters in the prefix and/or the prefix as a whole), provided by a user, etc. The scoring may also, or instead, be based on user historical interaction data and/or historical query data. In examples, the score may range from zero to one, with a higher score being a more preferred candidate. In other examples, a candidate score may be a binary score of zero or one based on whether the candidate is associated with a query that, when suggested by a user, was selected by the user. Alternatively or additionally, a candidate score may be a binary score of zero or one based on whether the candidate is associated with a query that is associated with particular content that was selected by the user. In examples, such criteria may be used in combination and/or as a weighting factor. As described in more detail below, the scoring may be performed by one or more machine-learned models.

The autocompletion candidates may be ranked based on the determined scores to determine an ordered list of autocompletion suggestions to present to the user. This list may be used at the search application interface to provide, in descending score order, suggested search queries to the user.

In an example of using the disclosed enhanced search autocompletion framework, a user may enter two or three letters (e.g., "tri") into a text box input on a search application graphical user interface for searching a particular catalog of content, such as a catalog of video content available for streaming to a user device. The system implementing the framework may access a knowledge graph of a catalog of content and determine a subgraph using the prefix by identifying and extracting nodes that explicitly include the prefix in the node content and/or the node metadata (e.g., exact matches with "tri," such as "triple play," "triangle," "triathlon," "Trisha," etc.). The system may further extract nodes for the subgraph that are linked to the nodes that explicitly include the prefix (e.g., within a predetermined number K of links). The system may further determine historical interaction data for the user submitting the prefix and identify queries in such data that also match the prefix in some way. The subgraph and the matched historical queries may serve as potential autocompletion candidates.

Using these autocompletion candidates, the system may next determine historical search queries for all users of the catalog over the past 24 hours. The system may match node content represented in the subgraph to queries from the historical search queries for all users that resulted in consumption of that node content and include such queries on the autocompletion candidates. The system may also, or instead, include in the autocompletion candidates historical queries that explicitly include some or all of a name of content represented in the subgraph. The system may also, or instead, include in the autocompletion candidates historical queries that match in some way node content and/or node metadata. The system may also, or instead, include in the autocompletion candidates historical queries in a common or popular set of queries that match in some way content that is included in a user's content consumption history.

The system may then execute a machine-learned model to determine a score for the individual autocompletion candidates based on using, as input, various available embeddings associated with or representing each such candidate and/or the prefix (e.g., "tri"). This scoring may also be determined using user historical interaction data and/or more general historical data (e.g., historical search queries by other (e.g., all) users). The system may rank the scored autocompletion candidates and order them in descending order for presentation to the user. The system may transmit this ordered list of autocompletion candidates for presentation proximate to the text box input on the search application graphical user interface at which the prefix was first received (e.g., "suggested searches: Trisha, triangle, triathlon, . . . "). The list may be user-selectable such that the user may initiate a search using the suggested autocompletion candidate by selecting that candidate on the search application graphical user interface.

The disclosed systems and techniques provide a more efficient and effective means of determining suggested autocompletions for a search application. By facilitating a more efficient determination of relevant autocompletion suggestions, the examples described herein may provide faster and more efficient means of locating desired content or other information for a user while reducing the unnecessary usage of resources that may result from providing less relevant suggestions. For example, in the disclosed system, more relevant autocompletion suggestions are provided to a user, thereby reducing the number of suggestions that may need to be presented until the user identifies the desired search terms and therefore the resources used to complete the searching process. By processing fewer searches due to providing more relevant suggestions sooner, the number of processor cycles needed to process (e.g., less relevant) searches, memory resources to store search data, and network resources required to exchange search data may be reduced. Furthermore, by providing autocompletion suggestions that pertain directly to available content, resources are not wasted processing search queries that are unlikely to result in the locating and providing of content that may actually be capable of being consumed by the user. Thus, the disclosed systems and techniques improve the user experience while minimizing inefficacies, increasing available network bandwidth (and thereby reducing latency), increasing available memory for other processes and operations, and improving system performance.

The techniques and systems described herein may be implemented in a number of ways. Example implementations and additional details are provided below with reference to the following figures.

FIG. 1 is a block diagram of an illustrative environment 100 that may be a portion of, or otherwise associated with, a system incorporating an enhanced search autocompletion framework or any other type of data processing and/or storage system. The environment 100 may include a search autocompletion system 104 and a machine-learned model training system 142. The environment 100 may also include a user device 102 that may be any kind of user device (e.g., smartphone, computer, laptop, tablet, cable box, etc.) that may allow a user to interact with a search application interface or otherwise request a search of a catalog of content or other system configured to store and/or access searchable files. The environment 100 may also include a user data store 136 and a query data store 156 that may each be one or more data storage systems of any type. The systems 102, 104, and 142, as well as the data stores 136 and 156, may each represent one or more physical and/or logical resources, such as one or more server computers, virtual machines, software resources, databases, notebooks clusters, datasets, etc., or any combination thereof.

The search autocompletion system 104 may be configured to receive a search prefix and associated data from a search application (e.g., via a search application interface) and determine autocompletions based on such data. For example, the search autocompletion system 104 may receive prefix data 106 from the user device 102. In examples, the prefix data 106 may be generated or otherwise determined by a search application and/or an associated interface configured at the user device 102. The prefix data 106 may include one or more characters provided by a user (e.g., entered into a search interface text box input) of the user device 102 as well as associated metadata. The prefix data 106 metadata may include user-identifying data (e.g., account number, login, username, email address, IP address, etc.) that may be used as described herein to determine a user and associated personalized matches and other user-specific data.

The prefix data 106 may be received at an autocompletion candidate determination component 108 that may include a context generation component 110 and a candidate generation component 118. The prefix data may be initially processed by the context generation component 110 to determine data that may be used to determine potential candidates. The context generation component 110 may include a subgraph generation component 112 that may be configured to determine a subgraph from which autocompletion candidates may be determined. The subgraph generation component 112 may determine this subgraph by extracting nodes from a knowledge graph representing the available content in a catalog representing a target search space. The subgraph generation component 112 may also, or instead, determine this subgraph based on one or more other data structures representing a target search space. The subgraph generation component 112 may search the nodes (e.g., node content and/or node metadata) in the knowledge graph of the target search space using the prefix from the prefix data 106 to identify nodes that have content and/or metadata that matches the prefix. For instance, the subgraph generation component 112 may identify exact matches with node content or metadata. The subgraph generation component 112 may also, or instead, determine context matches, semantic matches, and/or other match types between the prefix and node content and/or node metadata represented in the target search space knowledge graph. Based on such matches, the subgraph generation component 112 may determine a subgraph of the target search space knowledge graph that includes the matched nodes. The subgraph generation component 112 may link the prefix-matching nodes in the subgraph.

The subgraph generation component 112 may also determine one or more nodes that are linked in the target search space knowledge graph to one or more of the nodes extracted for the subgraph. This may result in the inclusion of potential autocompletion candidate node data that is more likely to be associated with the prefix because such node data is linked to one or more other nodes that contain data that exactly matches the prefix. For example, the subgraph generation component 112 may determine that the prefix exactly matches a node with content in a particular genre. By including other nodes in the subgraph that are linked to that node due to sharing the genre, the subgraph may include additional potential candidate autocompletions that are more likely to be relevant to the search initiated by the user providing the prefix.

To expand the subgraph with such data that may be more likely to be relevant to the user, the subgraph generation component 112 may identify one or more nodes that do not have content or metadata that exactly matches the prefix but are within a predetermined number of links of one or more (e.g., at least two) determined subgraph nodes that match the prefix. The subgraph generation component 112 may add these knowledge graph nodes to the subgraph. As noted above, the predetermined link count K used to identify contextual matching nodes may be determined based on a desired subgraph size. For example, a subgraph may be relatively small for a very specific or lengthy prefix. In response to determining that the subgraph is too limited (e.g., based on a threshold minimum subgraph size), the subgraph generation component 112 may increase K to increase the number of nodes in the subgraph. Alternatively, a subgraph may be relatively large for a very general or short prefix. In response to determining that the subgraph is too large (e.g., based on a threshold maximum subgraph size), the subgraph generation component 112 may decrease K to reduce the number of nodes in the subgraph. These K adjustments may allow the system the flexibility to increase the subgraph when needed to increase the available potential candidate autocompletions, while also limiting the subgraph size to improve resource utilization efficiency and/or processing times. In various examples, the subgraph size and/or K may be restricted to a range of values to ensure the provides an appropriate quantity and/or variety of potential candidate autocompletions while limiting the overutilization of system resources.

The context generation component 110 may include a historical interactions component 114 that may be configured to determine potential candidate autocompletions from historical user data and/or other user data. The historical interactions component 114 may transmit a request of user data as user data query 138 to the user data store 136. The user data query 138 may include one or more pieces of data identifying the user and/or other data that may be used by the user data store 136 to retrieve appropriately responsive user data and/or other data associated with the user (e.g., that provided the prefix in the prefix data 106). The user data store 136 may, in response, transmit the user data 140 to the autocompletion candidate determination component 108 and, in particular, to the historical interactions component 114. In examples, the user data 140 may include previous searches performed by the user, previous content consumed by the user, previous content and/or data selections made by the user, one or more user preferences, one or more user account settings, etc.

In examples, the historical interactions component 114 may compare the prefix provided by the user and represented in the prefix data 106 to the user data 140. If the prefix is found to (e.g., explicitly, semantically, exactly, etc.) match one or more pieces of data in the user data 140, the historical interactions component 114 may include such data ("personalized match" data) as potential autocompletion candidate data.

The context generation component 110 may aggregate and/or otherwise collect the autocompletion candidate subgraph determined by the subgraph generation component 112 and the potential autocompletion candidate data based on historical interactions determined by the historical interactions component 114 as context 116. The context generation component 110 may provide the context 116 to the candidate generation component 118 of the autocompletion candidate determination component 108.

The candidate generation component 118 may be configured to determine autocompletion candidates from the context 116. The candidate generation component 118 may be configured with a subgraph search component 120 that may be configured to search the subgraph of the context 116 using historical search queries not necessarily associated with the user that provided the prefix of the prefix data 106 to determine autocompletion candidates. The subgraph search component 120 may request historical search query data by transmitting a historical query data query 158 to a query data store 156 that may store or otherwise access historical query data for users (e.g., all users of the content system associated with the search autocompletion system 104). The historical query data query 158 may include data indicating a timeframe for the requested queries and/or other data that may be used by the query data store to determine a subset of historical query data to provide in response. For example, the historical query data query 158 may request all queries for the past hour, day, week, etc. In another example, the historical query data query 158 may also, or instead, request all queries associated with users sharing an attribute or preferences with the user that provided the prefix of the prefix data 106. Any other criteria and/or combinations of criteria may be provided in the historical query data query 158. The query data store 156 may respond by transmitting historical query data 160 to the autocompletion candidate determination component 108 and, in particular, to the subgraph search component 120. The historical query data 160 may include the text of a query used by one or more users as well as metadata associated with such search queries, such as data indicating whether the query resulted in a selection (e.g., "click") and/or consumption of particular content.

The subgraph search component 120 may search the subgraph for matches to the queries included in the historical query data 160 and associate queries to nodes in the subgraph based on such matches. For example, the subgraph search component 120 may associate a historical query that has query text that matches node content in a node with that node. The subgraph search component 120 may also, or instead, associate a historical query that resulted in a selection of a particular piece of content with a node in the subgraph associated with that piece of content. In examples, the system may further associate a historical query with one or more nodes linked to a node in the subgraph that matched the query, for example, associating nodes within a predetermined number of links (e.g., number of links K that may be adjusted as described above) of the matching node. Such queries and/or the associated nodes may be included in the set of autocompletion candidates to increase the relevance of the set of autocompletion candidates.

The candidate generation component 118 may be configured with a generic query search component 122 that may be may also, or instead, determine autocompletion candidates from the potential autocompletion candidate data in the context 116 determined based on historical interactions determined by the historical interactions component 114. The generic query search component 122 may determine, for example using the historical query data 160, common and/or popular historical search queries (e.g., associated with one or more other users). The generic query search component 122 may then determine matches between such queries and the prefix and/or personalized match data. For example, the generic query search component 122 may identify common or popular searches that explicitly include the prefix. The generic query search component 122 may also, or instead, determine, for example using the user data 140, that a user's content consumption history includes content associated with a common or popular query. Based on such associations, the generic query search component 122 may identify the queries from among the common and/or popular queries in the historical query data 160 as autocompletion candidates. Other matches of personalized and/or other data to one or more historical search queries (e.g., common and/or popular historical search queries) may also be used by the generic query search component 122 to determine and/or further augment the autocompletion candidates.

The candidate generation component 118 may aggregate or otherwise collect the autocompletion candidates determined by the subgraph search component 120 and the generic query search component 122 as autocompletion candidates in autocompletion candidate, user, and historical data 124 (also referred to as "autocompletion candidate data 124"). Also included in the autocompletion candidate, user, and historical data 124 may be embeddings of any type and/or any other data that may be associated with any type of autocompletion candidate. An embedding may be a (e.g., dense) numerical representation of an autocompletion candidate or other data object described herein and may further represent such an object's relationships. In some examples, an embedding may be expressed as a vector. Embeddings may be determined and/or extracted by one or more machine-learned models as described herein. Any other features of one or more of the determined auto autocompletion candidates may be included in the autocompletion candidate, user, and historical data 124.

The autocompletion candidate determination component 108 may also include historical query data (e.g., some or all of the historical query data 160 as determined by the generic query search component 122 and/or the candidate generation component 118) and/or user data (e.g., some or all of the user data 140 as determined by the historical interactions component 114 and/or the context generation component 110) in the autocompletion candidate, user, and historical data 124. The autocompletion candidate determination component 108 may also include in the autocompletion candidates, user, and historical data 124 any other features that may be extracted and/or used for scoring (e.g., by a machine-learned model as described herein). The autocompletion candidate determination component 108 (e.g., the candidate generation component 118) may provide the autocompletion candidate, user, and historical data 124 to the autocompletions determination component 126.

The autocompletions determination component 126 may score and rank the autocompletions candidates indicated in the autocompletion candidate, user, and historical data 124 and provide them for user presentation by a search application and/or interface. The autocompletions determination component 126 may include an autocompletion candidate scoring component 128 that may be configured to score such autocompletion candidates. In various examples, such scoring may be based on embedded data associated with a subgraph node, a candidate query, the prefix (e.g., the characters in the prefix and/or the prefix as a whole), provided by a user, etc. Such scoring may also, or instead, be based on user data (e.g. user historical interaction data, user preferences, user search history, etc.) and/or historical search query data (e.g., searches performed by one or more (e.g. other) users). In various examples, the autocompletions determination component 126 may acquire data, such as user data and/or historical data, independently (e.g., from a source other than the autocompletion candidate, user, and historical data 124). A candidate score may range from zero to one, with a higher score being a more preferred candidate. In other examples, a candidate score may be a binary score of zero or one based on whether the candidate is associated with a query that, when suggested by a user, was selected by the user. Alternatively or additionally, a candidate score may be a binary score of zero or one based on whether the candidate is associated with a query that is associated with particular content that was selected by the user. In examples, such criteria may be used in combination and/or as a weighting factor. The autocompletion candidate scoring component 128 may generate scored autocompletion candidates 130 based on the autocompletion candidates represented in the autocompletion candidate, user, and historical data 124 and the scoring operations performed. The autocompletion candidate scoring component 128 may provide the scored autocompletion candidates 130 to an autocompletion candidate ranking component 132 of the autocompletions determination component 126.

The autocompletion candidate ranking component 132 may rank the scored autocompletion candidates 130 based on the determined scores to determine an ordered list of autocompletion suggestions as ordered autocompletions 134. The ordered autocompletions 134 may be transmitted to the user device 102 for use by the search application and/or for presentation on a search interface to provide, in descending score order, suggested search queries to the user.

In various examples, the autocompletions determination component 126 may be configured to execute one or more machine-learned models to perform one or more of the candidate scoring and/or ranking functions (e.g., one or more of the operations performed by the autocompletion candidate scoring component 128 and/or the autocompletion candidate ranking component 132). For example, a machine-learned model training system 142 may be configured with a model training component 144 that trains a trained candidate scoring model 152 to generate, as output, an ordered list of autocompletion candidates (e.g., ordered autocompletions 134) using autocompletion candidates (e.g., autocompletion candidates represented in autocompletion candidate data 124) and/or other data (e.g., embeddings, user data, historical data, etc.) as input.

The training data 146 used by the model training component 144 may include one or more subgraphs of a knowledge graph and/or associated embeddings. In examples, embeddings may be generated as output by a pre-trained language model using autocompletion candidates and/or historical search data as input. Time, positional, and/or segment encoding data may also be included in the training data 146. In examples, noise may be added to the training data (e.g., prefix training data) to train the model to be more robust to spelling and other types of errors.

The model training component 144 may train a model with one or more layers. For example, the trained candidate scoring model 152 may include one or more graph neural network (GNN) layers trained to process a subgraph to determine text and/or user embeddings and one or more language model (LM) layers trained to process text embeddings and/or user embeddings (e.g., as determined by the GNN layer). In some examples, user embeddings may be provided as input directly to an LM layer (e.g., not from processing by a GNN layer). In various examples, the outputs of various GNN and LM layers may be fused to ensure that corresponding layers utilize both text and subgraph data. The trained candidate scoring model 152 may then determine scores for candidates (e.g., the autocompletion candidates represented in autocompletion candidate data 124) based on determined embeddings, user data, historical data, etc. These scores may be based on how well (e.g., from not all (e.g., zero) to completely (e.g., one)) the prefix and the autocompletion candidate correspond or "match." The training and inference operations of a model such as the trained candidate scoring model 152 are described in more detail below (e.g., regarding FIG. 2 below).

The systems and methods described herein may be faster, more efficient, and more robust than conventional systems and methods for determining autocompletions, as they may facilitate the efficient determination of increasingly relevant autocompletion suggestions and therefore reduce the repeated processing associated with determining autocompletion suggestions. That is, the systems and methods described herein provide a technological improvement over existing autocompletion determination processes that involve evaluating prefixes using minimal (or no) contextual data that may result in less relevant autocompletion suggestions and therefore more frequently repeated autocompletion determination operations, increasing the speed and efficiently of such operations. Moreover, the systems and methods described herein provide a significant increase in the relevance of suggested autocompletions because scoring and ranking of suggested autocompletions may be performed by trained and executed machine-learned models that increase the accuracy of relevancy determinations, while greatly reducing the likelihood of presenting irrelevant or less relevant suggested autocompletions to a user.

By providing more relevant suggested autocompletions to a user, processing requirements for determining autocompletions are reduced because the frequency of performing the related operations is reduced. For example, because more relevant autocompletion or proposed to a user sooner, the user may not be required to enter more text (that then triggers additional autocompletion operations) before recognizing a relevant autocompletion suggestion. The autocompletion determination techniques described herein further increase the efficiency of the disclosed systems and methods because more relevant data is presented while less relevant or irrelevant data is eliminated before presentation on an interface, thereby reducing the processing and memory requirements of the present systems and methods even further over conventional techniques. Accordingly, fewer storage resources and fewer processing resources may be required to determine autocompletions using these systems and methods and fewer network resources are needed to transmit and receive associated data.

Figure 2:
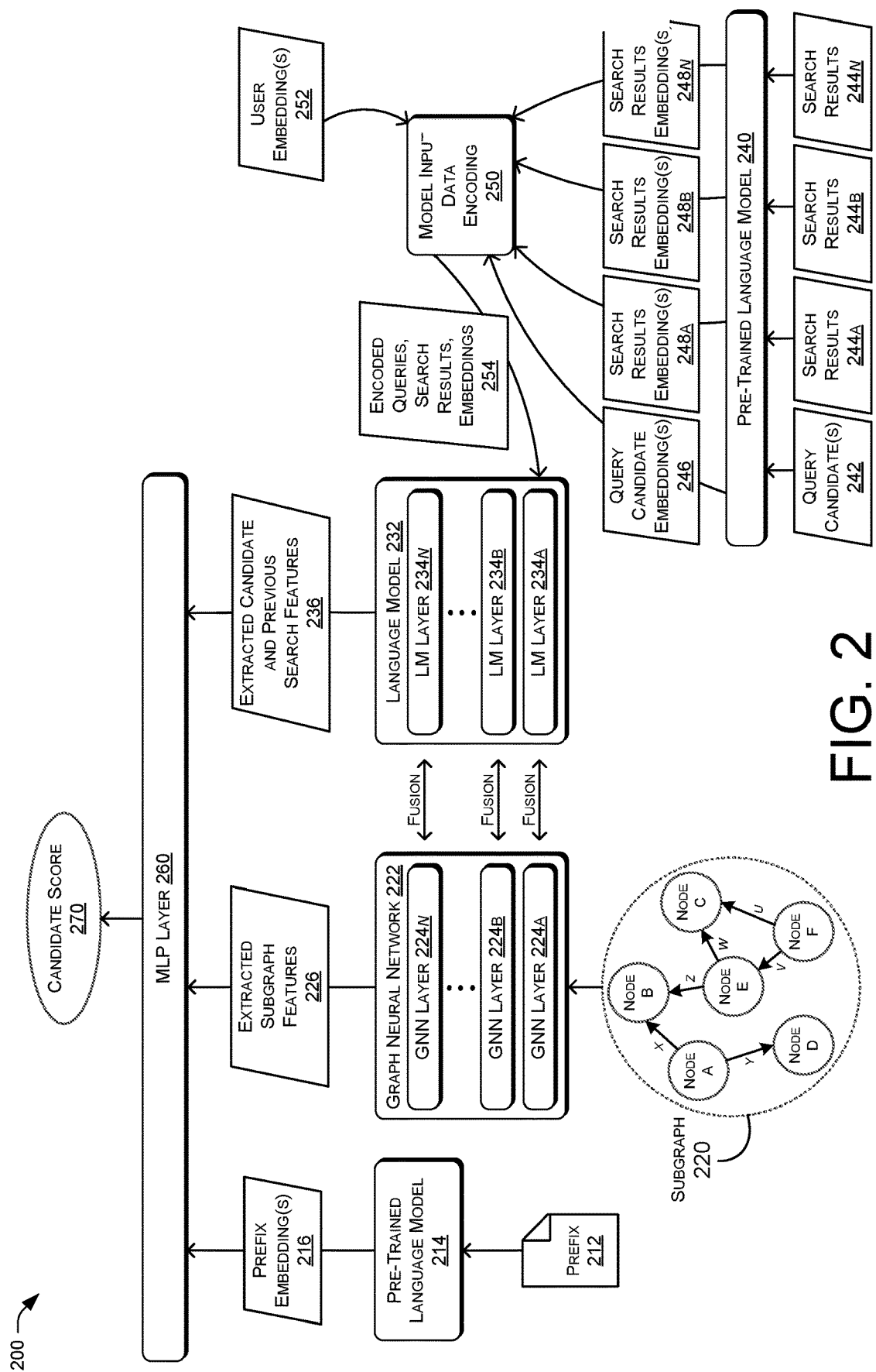
FIG. 2 illustrates an autocompletion machine-learned model pipeline that may be integrated into systems and techniques that utilize an enhanced search autocompletion framework.

FIG. 2 is a block diagram of an illustrative machine-learned model pipeline 200 that may be executed and/or trained by, or otherwise associated with, a system incorporating an enhanced search autocompletion framework or any other type of data processing and/or storage system. The pipeline 200 may be implemented as a machine-learned model in such a system, such as the trained candidate scoring model 152, one or more other models executed within the search autocompletion system 104, and/or trained at the machine-learned model training system 142 of FIG. 1. The pipeline 200 may be implemented at and/or using one or more physical and/or logical resources, such as one or more server computers, virtual machines, software resources, databases, notebooks clusters, datasets, etc., or any combination thereof.

The pipeline 200 may include various layers and/or models that may generate output that may be provided to a neural network layer that ultimately generates a candidate score 270 for a particular autocompletion candidate. Each of these various lower layers and/or models may execute in parallel to provide output to the output generation layer (may be referred to as the "top" layer). In various examples, this top layer may be a feedforward artificial neural network (ANN), such as a multilayer perceptron (MLP) ("MLP layer"). As shown in the example illustrated in FIG. 2, the top layer of the pipeline 200 is an MLP layer 260.

Embeddings associated with prefixes may be provided to the MLP layer 260 for candidate score output generation. For example, a prefix 212 received from a user (e.g., via a search interface text box) may be provided to a pre-trained language model 214 trained to determine prefix embeddings 216 from the prefix 212. The prefix embeddings 216 may be provided as input to the MLP 260.

Graph features of a subgraph may also be provided (e.g., in parallel) to the MLP layer 260 for candidate score output generation. For example, a subgraph 220 (that may have been determined using the prefix 212) may be provided to a GNN 222 that may include one or more GNN layers 224a . . . n, where such layers may be trained to process the subgraph 220 to determine text and/or user embeddings and, in some examples, other features of the subgraph 220 as extracted subgraph features 226.

In various examples, the GNN layers 224a . . . n may also use, as input data, data generated as output by one or more corresponding layers in another model and/or may also provide output data as input data to one or more such models. For example, the GNN layer 224*a* may provide output to the LM layer 234*a* of the language model 232 and may receive input from the LM layer 234*a*, the GNN layer 224*b* may provide output to the LM layer 234*b* of the language model 232 and may receive input from the LM layer 234*b*, and so forth. This fusion of subgraph data and other types of search query and/or candidate data (e.g., text data) may facilitate the determination of more relevant features by the GNN 222.

Prefix and/or previous search features may also be provided (e.g., in parallel) to the MLP layer 260 for candidate score output generation. For example, data (e.g., text data) associated with the prefix 212, one or more autocompletion candidates, one or more search queries and/or associated search results, and/or user embeddings may be provided to the language model 232 that may include, as noted, one or more LM layers 234*a* . . . *n*. In FIG. 2, such data is represented as encoded queries, search results, and embeddings 254. The data 254 may be provided to any layer of the language model 232. In a particular example, the data 254 may be provided to a first layer (e.g., LM layer 234*a*) for processing to generate data that may then be provided as input to a next layer (e.g., LM layer 234*b*) that generates data for a next layer, and so forth until a final layer (e.g., LM layer 234*n*) generates the output for the language model 232. These layers may be trained to process the encoded queries, search results, and embeddings 254 and/or other model input data to determine a candidate, one or more associated features, previous search features, historical data, and/or any other data that may be used to score a candidate as extracted candidate and previous search features 236.

Similar to the fusion described above performed by the GNN layers 224*a* . . . *n*, the LM layers 234*a* . . . *n* may also use, as input data, data generated as output by one or more corresponding layers in another model and/or may also provide output data as input data to one or more such models. For example, the LM layer 234*a* of the language model 232 may provide output to the GNN layer 224*a* and may receive input from the GNN layer 224*a*, the LM layer 234*b* of the language model 232 may provide output to the GNN layer 224*b* and may receive input from the GNN layer 224*b*, and so forth. This fusion of text data and subgraph data may facilitate the determination of more relevant features by the language model 232.

The encoded queries, search results, and embeddings 254 may be determined based on various types of data, including text data. The data 254 may be encoded based on embeddings determined by a language model and/or provided by or associated with one or more users. In some examples, additional encodings may also be used to determine the data 254 at an encoder, such as segment and/or time encoding and/or positional encoding.

For example, as illustrated in FIG. 2, query candidate(s) 242 may include one or more historical search queries based on historical query data that may be associated with one or more users that may not necessarily include the user that provided prefix 212. The query candidate(s) 242 may be provided to a pre-trained language model 240. The model 240 may be trained to determine one or more embeddings from the text data of query candidate(s) 242, generating query candidate embedding(s) 246 as output. Search results associated with one or more search queries may also be provided to the pre-trained language model 240 to determine associated embeddings, in some examples exclusively for training purposes, while in other examples during inference and training. For example, search results 244*a* . . . *n* from previously performed searches associated with past search queries may be provided to the pre-trained language model 240 that may generate corresponding search results embedding(s) 248*a* . . . *n*.

The embeddings 246 and 248*a* . . . *n* may be provided to model input data encoding component 250 that may be configured to concatenate, aggregate, and/or otherwise collect such embeddings into encoded queries, search results, and embeddings 254 as model input data for the language model 232. The model input data encoding component 250 may further include one or more user embeddings 252 in the encoded queries, search results, and embeddings 254 and any other model input data it generates. The model input data encoding component 250 may use temporal, positional, and/or segment encoding data to organize, separate, and/or position the embeddings data and other data in the encoded queries, search results, and embeddings 254 as model input data for processing by the language model 232.

Figure 3:
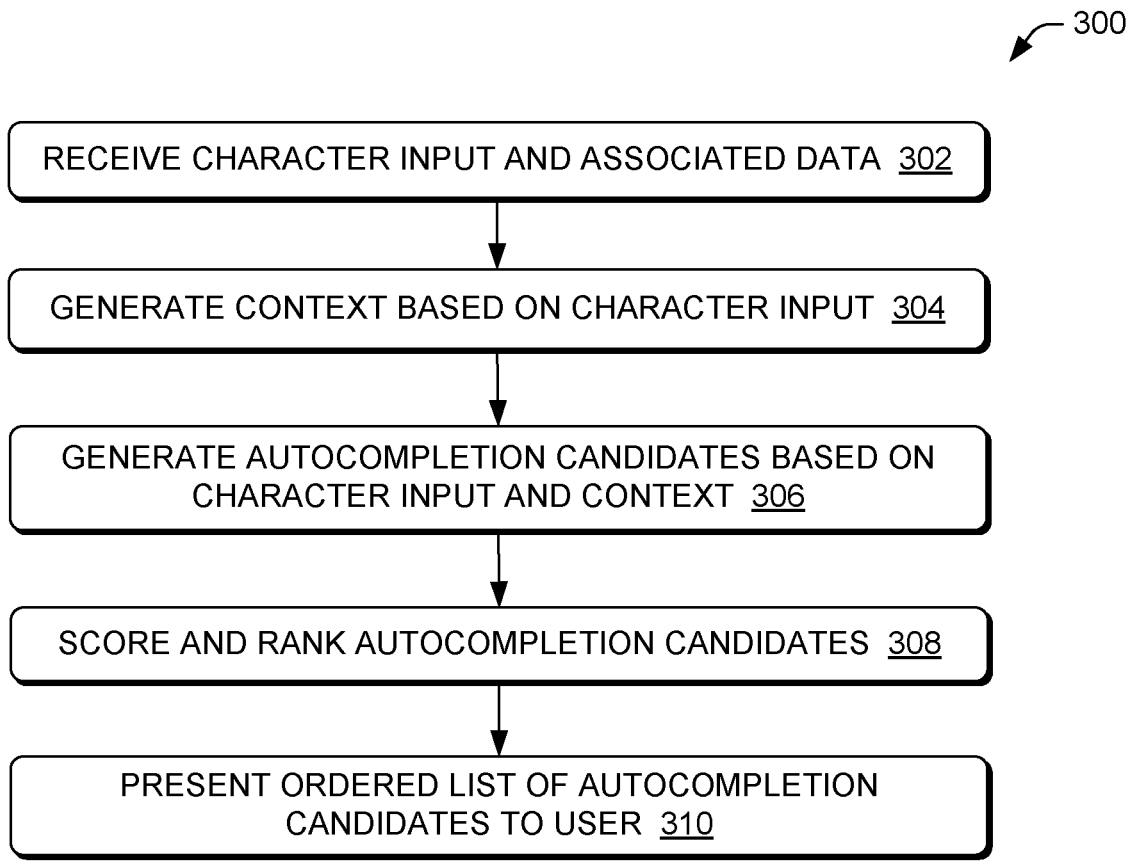
FIG. 3 illustrates a flow diagram of an example method for determining and presenting an ordered list of autocompletion candidates to a user of a search application.
Figure 4:
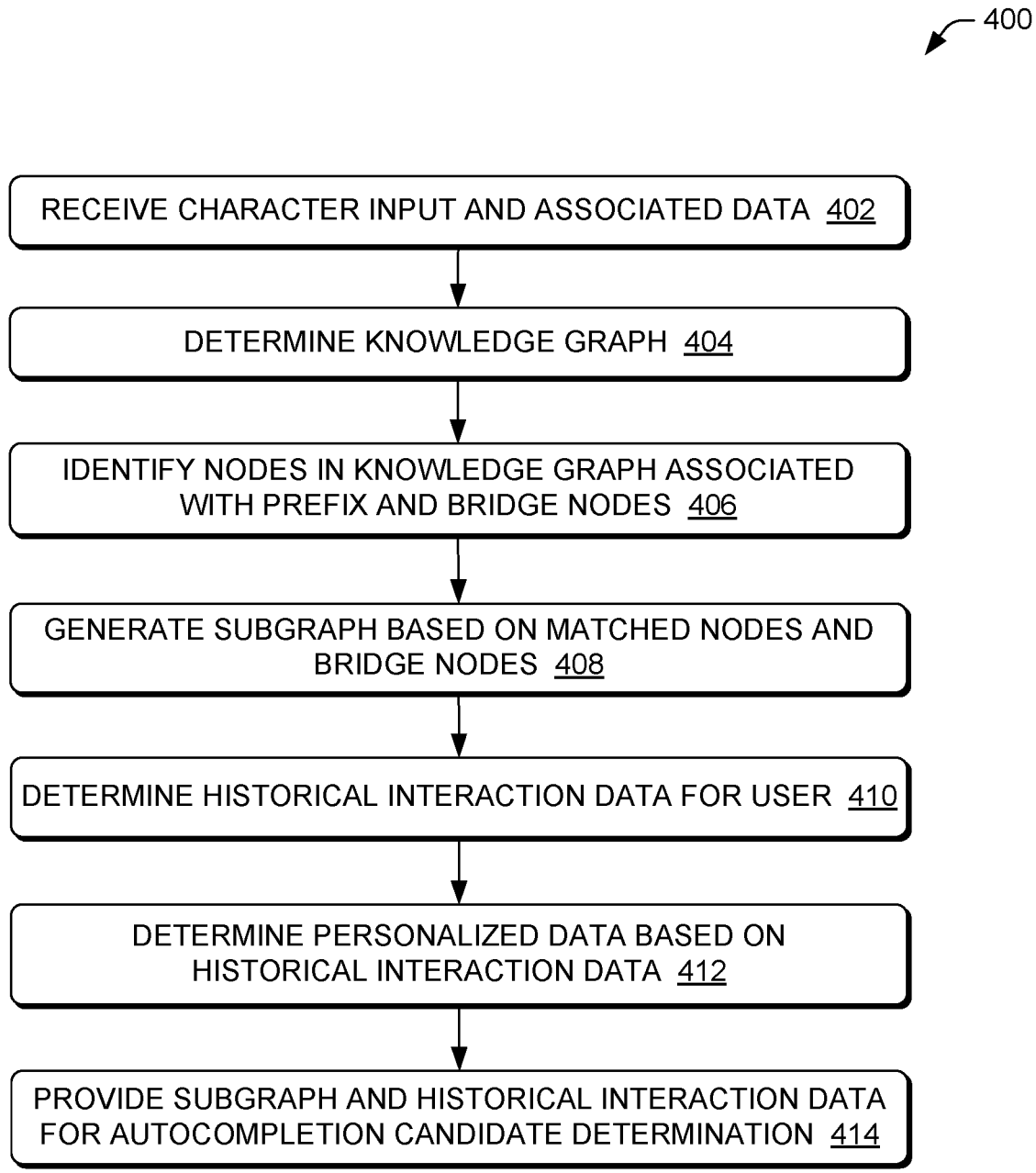
FIG. 4 illustrates a flow diagram of an example method for determining a subgraph, historical interaction data, and contextual data for use in an enhanced search autocompletion framework for determining autocompletion candidates.
Figure 5:
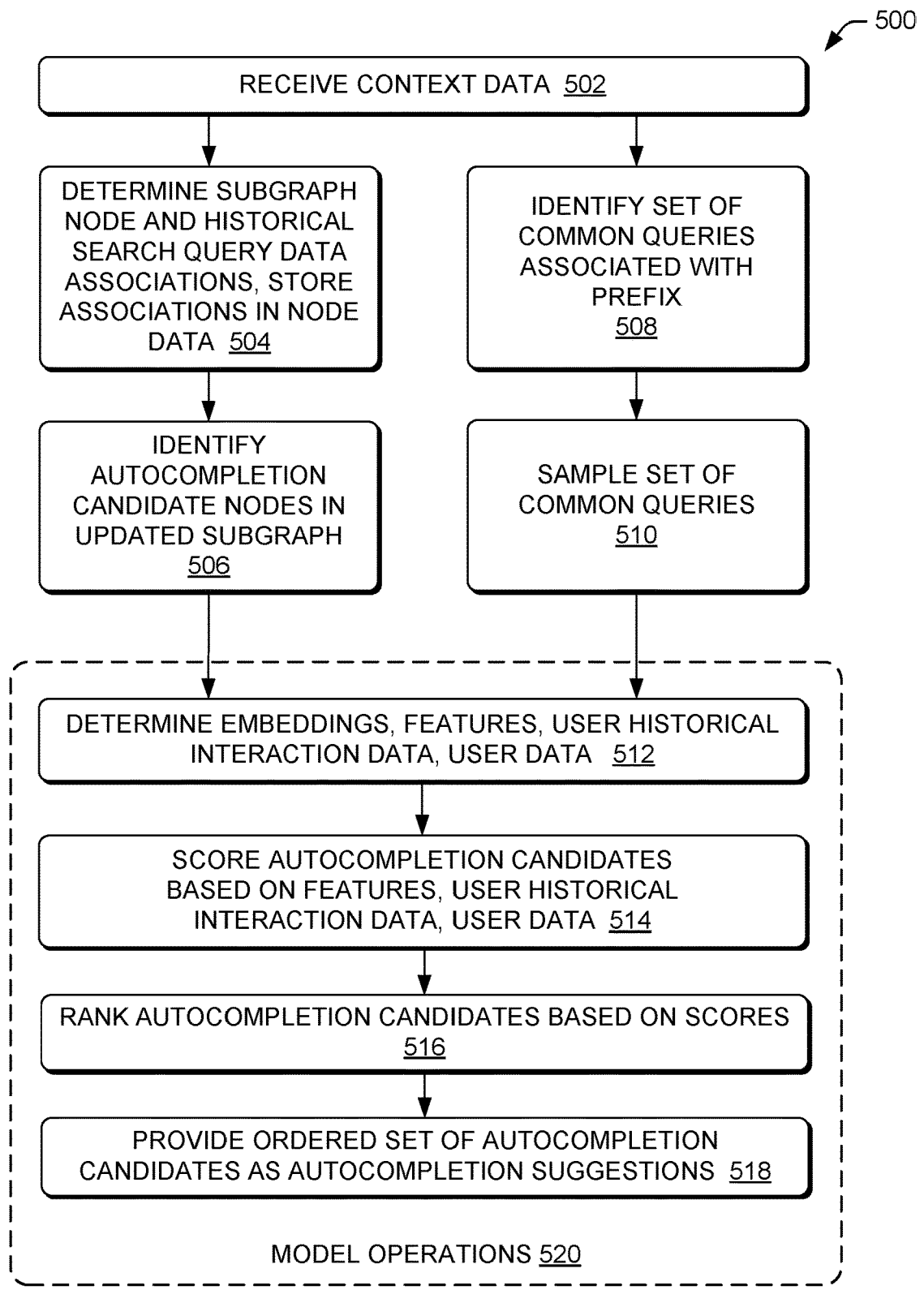
FIG. 5 illustrates a flow diagram of an example method using subgraphs, historical interaction data, and contextual data in an enhanced search autocompletion framework to determine ordered autocompletion candidates for presentation to a user of a search application.

FIGS. 3-5 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 is a flow diagram of an illustrative process 300 to determine an ordered list of auto completion candidates based on a received prefix. The process 300 may be described at times with reference to the environment 100 and/or the pipeline 200 and may be performed by the search autocompletion system 104 that may include a pipeline such as the pipeline 200, but the process 300 may also, or instead, be performed in other similar and/or different environments by other similar and/or different systems.

At 302, a prefix may be received as character input, for example, from a user interacting with a search application and entering one or more characters into a text box on an interface generated or otherwise interacting with the search application. For example, the user may enter two or three characters into a text box to initiate a search process. Based on detecting these characters, the search application may transmit these characters as a prefix to a search autocompletion system. The search application may also transmit other data associated with the prefix, such as data identifying the user and/or data that may otherwise be used to retrieve data associated with the user. For example, the search application may transmit a username, IP address, email address, etc. associated with the user.

At 304, the system may use the received prefix and associated data to generate a context as described herein. The context may include potential autocompletion candidates and associated data. For example, the system may generate a subgraph by matching the prefix to nodes in a knowledge graph representing a catalog of content, as described herein. The system may also, or instead determine potential autocompletion candidates by using the prefix to evaluate user search query history data, user preferences, user consumption history, and/or any other user and/or historical interaction data that may be available. The subgraph and any other potential autocompletion candidates may be consolidated with context data for further processing.

At 306, the system may determine a set of autocompletion candidates based on the context determined at 304. For example, as described in more detail herein, the system may use historical search queries to evaluate the subgraph and associate historical queries with particular attributes with nodes in the subgraph. For example, queries that resulted in consumption of a particular piece of content may be associated with a node in the subgraph representing that particular piece of content. These nodes and/or associated data may then be determined as autocompletion candidates based on this association. In another example, autocompletion candidates may be selected from common or popular historical search queries that match, in some manner, user historical interaction data, such as historical consumption data. Various other techniques may be used to determine a set of autocompletion candidates, including as described herein.

At 308, the set of autocompletion candidates may be scored and ranked. For example, one or more machine-learned models (e.g., model 152 of FIG. 1, pipeline 200 of FIG. 2) may be executed using the set of autocompletion candidates and associated data to generate output that includes a score for individual candidates of the set of autocompletion candidates and/or an ordered listing of the candidates ranked based on score.

At 310, the system may provide this listing of ordered autocompletion candidates to the user. For example, the system may transmit this listing to a search application for presentation to the user on a graphical user interface generated by, or otherwise interacting with, the search application.

FIG. 4 is a flow diagram of an illustrative process 400 to determine potential autocompletion candidates and/or context data based on a received prefix. The process 400 may be described at times with reference to the environment 100 and/or the pipeline 200 and may be performed by the search autocompletion system 104 that may include a pipeline such as the pipeline 200, but the process 400 may also, or instead, be performed in other similar and/or different environments by other similar and/or different systems.

At 402, a prefix may be received as character input, for example, from a user interacting with a search application and entering one or more characters into a text box on an interface generated or otherwise interacting with the search application. As described herein, the search application may transmit these characters as a prefix to a search autocompletion system along with other data that may be used to retrieve data associated with the user.

At 404, the system may determine a knowledge graph for use in generating a subgraph representing autocompletion candidate data. For example, the system may obtain an existing knowledge graph representing available items in a target search space, such as available content in a content provider system. Alternatively or additionally, the system may generate a knowledge graph representing a catalog of content and/or items in a target search space. For example, the system may be configured to crawl one or more data stores in a system associated with a target search space and collect data that the system may then use to generate a knowledge graph representing the target search space.

At 406, the system may identify nodes in the knowledge graphs that are associated with the prefix. For example, the system may match the prefix to node content and/or node metadata for one or more nodes in the knowledge graphs. The system may select these nodes for inclusion in a subgraph at 408. The system may also select for inclusion in a subgraph node in the knowledge graph that may be connected by links to one or more nodes selected based on a match with the prefix. For example, nodes that are associated with one or more of the same or similar attributes (that may be represented by links between such nodes) as a matched node may be linked in the subgraph. At 408, the system may generate the subgraph.

At 410, the system may retrieve, for example using user-identifying data received at 402, historical user interaction data. For example, the system may retrieve user preferences, user consumption history, user search query data, and/or any other user and/or historical interaction data.

At 412, the system may determine relevant personalized data based on the historical interaction data and the prefix and/or other data. For example, the system may compare the prefix to user consumption history, user search query data, and/or any other user and/or historical interaction data to identify (e.g., explicit, exact, semantic, contextual, etc.) matches. If the prefix is found to match any pieces of such data, that data may be included as potential autocompletion candidate data and/or context data.

At 414, the system may provide the subgraph determined at 408 and/or the personalized data determined at 412 for use in determining autocompletion candidates (e.g., an ordered list of autocompletion candidates.

FIG. 5 is a flow diagram of an illustrative process 500 to determine an ordered list of auto completion candidates based on potential autocompletion candidates and other data, such as embeddings. The process 500 may be described at times with reference to the environment 100 and/or the pipeline 200 and may be performed by the search autocompletion system 104 that may include a pipeline such as the pipeline 200, but the process 500 may also, or instead, be performed in other similar and/or different environments by other similar and/or different systems.

At 502, context data associated with an initiated search query and/or prefix may be received. For example, and as described in more detail herein (e.g., as generated by process 400 of FIG. 5), a subgraph and personalized data (e.g., based on user historical interaction data) may be received, along with a prefix.

At 504, the system may access and/or search historical search queries (e.g., performed by other users and/or associated with a particular timeframe) for matches with one or more nodes in the subgraph. The system may also, or instead, use metadata associated with these historical search queries, such as data indicating whether the query resulted in a selection and/or consumption of particular content, to associate a query with other nodes that may be linked to a node matched to the query. The system may also, or instead, associate queries to nodes in the subgraph that otherwise share other attributes of some kind.

At 506, the system may determine the nodes in the subgraph that have associated queries as autocompletion candidates (e.g., identify the queries, node content and/or node metadata as autocompletion candidates) and/or nodes in the subgraph that match e.g., in any manner) the prefix (e.g., identify the matching node content and/or node metadata as autocompletion candidates).

At 508, for example in parallel with 504, the system may identify common or popular search queries that are associated with the prefix. For example, the system may determine a set of common or popular search queries for a time period (e.g., the most recent day, week, month, etc.) and determine queries from this set that includes or otherwise match the prefix.

In examples, at 510 the system may sample these common or popular search queries that match the prefix to determine a subset of such queries to use as autocompletion candidates. For instance, where the set of common or popular search queries that match the prefix is large, the system may be configured to determine a sample of size N of such queries. Alternatively, where the set of common or popular search queries that match the prefix is relatively small or where a large number of autocompletion candidates is desired, the total number of common or popular search queries that match the prefix may be used.

At 512, the embeddings and/or features for the autocompletion candidates determined at 506, 508, and/or 510 may be determined. Alternatively or additionally, embeddings for the nodes, queries, and/or other data that may be associated with such autocompletion candidates may be determined at 512. As described herein, in various examples these embeddings may be determined and/or processed using one or more machine-learned models (e.g., model 152 of FIG. 1, pipeline 200 of FIG. 2). Also or instead, at 512, user historical interaction data and/or other user data (e.g., user identifier, user historical interaction data, user preferences, etc.) and/or historical data that may be used for scoring operations may be determined. Further at 512 one or more encodings may be determined for the autocompletion candidates and/or for use in determining candidate scoring.

At 514, the system may use the embeddings, features, and/or other encoded data may be used to score the autocompletion candidates. As described herein, in various examples, autocompletion candidate scores may be determined using one or more machine-learned models (e.g., model 152 of FIG. 1, pipeline 200 of FIG. 2).

At 516, the autocompletion candidates may be ranked based on their respective scores. Here again, and as described herein, in various examples, autocompletion candidate ranking based on scores may be determined using one or more machine-learned models (e.g., model 152 of FIG. 1, pipeline 200 of FIG. 2).

At 518, the system may provide an ordered list of autocompletion candidates representing the ranked autocompletion candidates determined at 516 for use as autocompletion suggestions for a user. For example, the ordered list of autocompletion candidates may be transmitted to a search application that may present the ordered list of autocompletion candidates on a user interface for possible selection by a user.

In various examples, any one or more of the operations 512, 514, 516, and 518 may be model operations 520 that may be performed, at least in part, by executing one or more machine-learned models and/or within a model pipeline a described herein.

Figure 6:
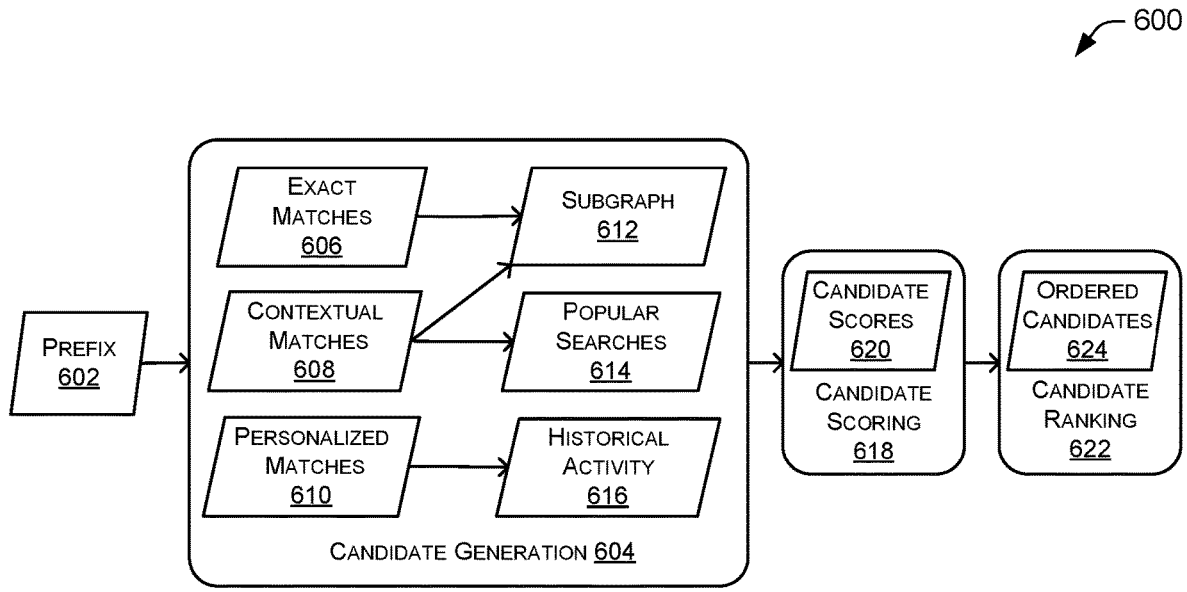
FIG. 6 illustrates a block diagram representing exemplary data that may be received, processed, and/or generated by a system implementing an enhanced search autocompletion framework.
Figure 7:
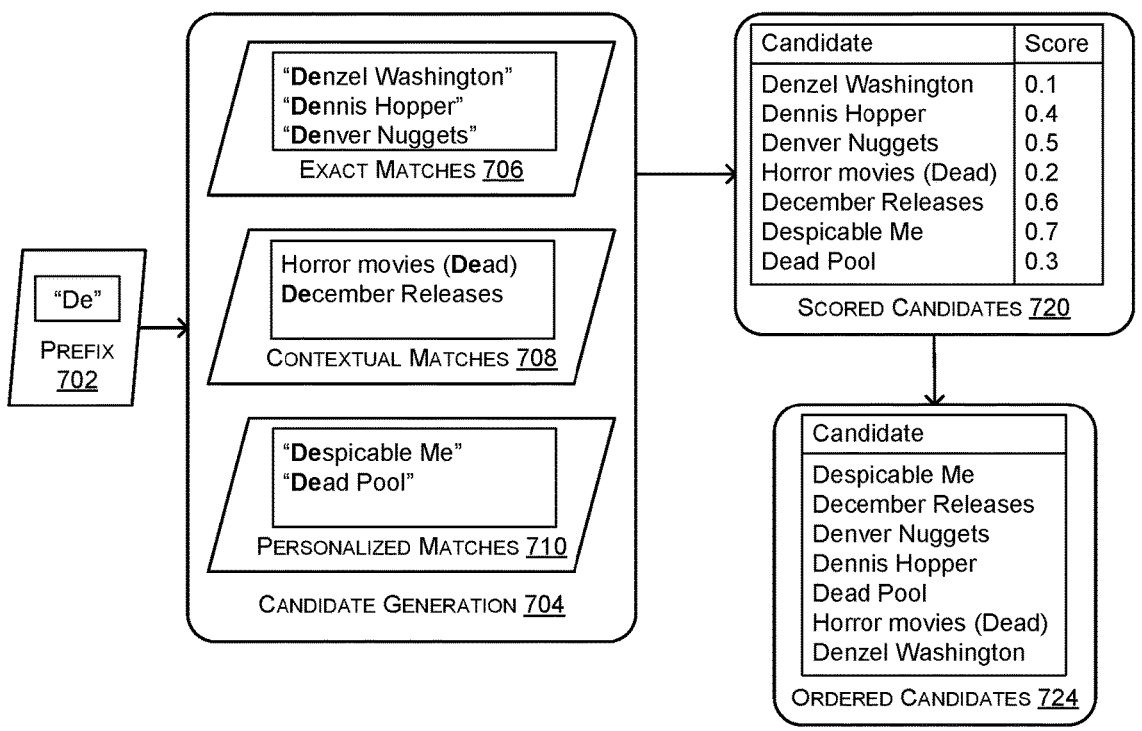
FIG. 7 illustrates a block diagram representing further exemplary data that may be received, processed, and/or generated by a system implementing an enhanced search autocompletion framework.

FIGS. 6 and 7 are representations illustrating exemplary data, such as prefix data, autocompletion candidate data, and associated data, that may be processed and/or determined using the disclosed enhanced search autocompletion framework and associated systems and methods. The data illustrated in these figures may be described at times with reference to the environment 100 and the search autocompletion system 104 and the pipeline 200, but this data may also, or instead, be processed and/or determined in other similar and/or different environments by other similar and/or different systems.

FIG. 6 illustrates an example 600 of the data that may be processed and/or generated using an enhanced search autocompletion framework to determine autocompletion candidates. In various examples, the processing and generation of data illustrated in the figure may be performed, at least in part, by an autocompletion machine-learned model pipeline, such as pipeline 200 of FIG. 2. A prefix 602 may be received by and/or otherwise obtained by a candidate generation component 604 of the framework.

The candidate generation component 604 may use the prefix 602 and a determined subgraph 612 of a target search space to determine exact matches 606 reflecting exact and/or semantic correspondences of the prefix 602 with node content and/or node metadata of nodes in the subgraph 612. These exact and/or semantic correspondences may be used as, or to determine, a first set of autocompletion candidates.

The candidate generation component 604 may also use the prefix 602 in conjunction with popular searches 614 to determine contextual matches 608. The contextual matches 608 may represent correspondences of the prefix 602 with one or more popular or common search queries, for example, from a recent time period (e.g., previous hour, day, week, etc.). These popular search query correspondences may be used as, or to determine, a second set of autocompletion candidates.

The candidate generation component 604 may also use the prefix 602 in conjunction with historical activity 616 to determine personalized matches 610. The personalized matches 610 may represent correspondences of the prefix 602 with historical interactions data (e.g., user consumption history, user search history, user preferences, etc.) for the user who provided the prefix 602. These historical activity correspondences may be used as, or to determine, a third set of autocompletion candidates.

The first, second, and third sets of autocompletion candidates may be generated or otherwise determined substantially in parallel, for example, within an enhanced search autocompletion framework and/or one or more machine-learned models and/or pipelines configured therein.

The aggregated or collected first, second, and third sets of autocompletion candidates may be provided to the candidate scoring component 618 that may determine candidate scores 620, for example, as described herein using a machine-learned model pipeline to determine such scores based on embeddings. The candidate scores 620 (e.g., along with the corresponding candidates) may then be provided to a candidate ranking component 622 that may rank and/or order the candidates based on the scores 620 to determine a set of ordered candidates 624. The set of ordered autocompletion candidates 624 may then be used to provide autocompletion suggestions to the user the initially provided the prefix 602.

FIG. 7 illustrates an example 700 of particular data that may be processed and/or generated using an enhanced search autocompletion framework to determine autocompletion candidates for an exemplary, non-limiting prefix. As with FIG. 6, the processing and generation of data illustrated in the figure may be performed, at least in part, by an autocompletion machine-learned model pipeline, such as pipeline 200 of FIG. 2. A prefix 702 of "De" may be received by and/or otherwise obtained by a candidate generation component 704 of the framework.

The candidate generation component 704 may use the prefix 702 ("De") and a determined subgraph of a target search space to determine exact matches 706 reflecting exact and/or semantic correspondences of the prefix 702 with node content and/or node metadata of nodes in the subgraph. In the example, the prefix "De" may exactly match data associated with several such nodes ("Denzel Washington," "Dennis Hopper," "Denver Nuggets"). These exact and/or semantic correspondences may be used as, or to determine, a first set of autocompletion candidates.

The candidate generation component 704 may also use the prefix 702 in conjunction with popular searches to determine contextual matches 708. The contextual matches 708 may represent correspondences of the "De" with one or more popular or common search queries, for example, from a recent time period (e.g., previous hour, day, week, etc.). In the example, the prefix "De" may match data associated with several popular or common search queries ("Horror Movies (Dead)," December Releases"). These popular search query correspondences may be used as, or to determine, a second set of autocompletion candidates.

The candidate generation component 704 may also use the prefix 702 in conjunction with historical activity associated with the user that provided the prefix 702 to determine personalized matches 710. The personalized matches 710 may represent correspondences of the prefix "De" with historical interactions data (e.g., user consumption history, user search history, user preferences, etc.) for the user who provided the prefix 702. In the example, the prefix "De" may match data associated with previous user consumption choices ("Despicable Me," "Dead Pool"). These historical interaction correspondences may be used as, or to determine, a third set of autocompletion candidates.

The aggregated or collected first, second, and third sets of autocompletion candidates may be provided to a candidate scoring component that may determine sored for the autocompletion candidates to generate scored candidates 720, for example, as described herein using a machine-learned model pipeline to determine such scores based on embeddings. The scored candidates 720 shown here may represent a variety of candidate scores with the corresponding candidates. These scored candidates 720 may be provided to a candidate ranking component that may rank and/or order the candidates based on the scores in scored candidates 720 to determine a set of ordered candidates 724. The set of ordered autocompletion candidates 724 may then be used to provide autocompletion suggestions to the user the initially provided the prefix 702.

Figure 8:
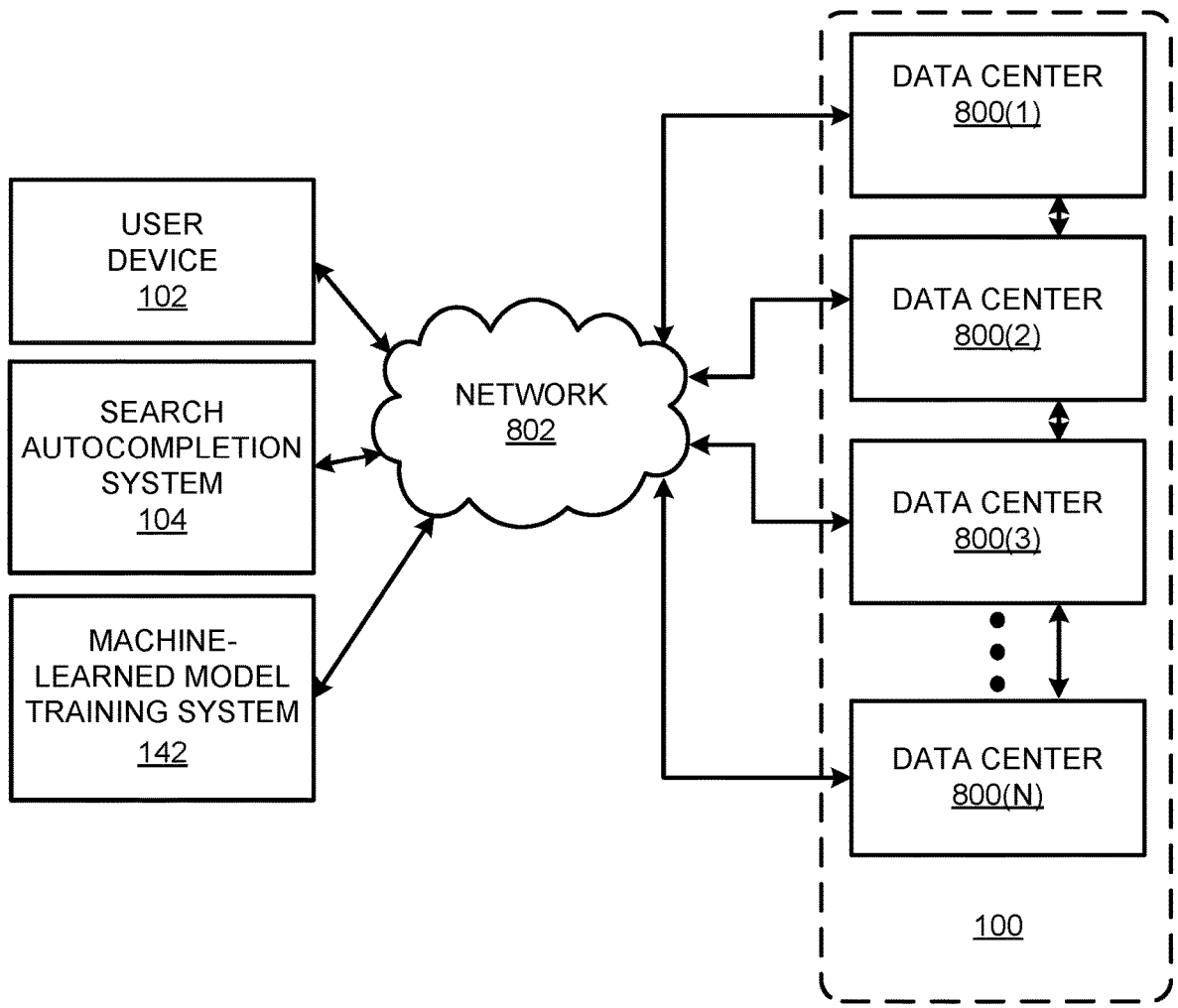
FIG. 8 is a system and network diagram that shows an illustrative operating environment that includes a system that can be configured to implement aspects of the functionality described herein.

FIG. 8 is a system and network diagram that shows an illustrative operating environment that includes a user device 102, a search autocompletion system 104, and a machine-learned model training system 142 that can be configured to implement aspects of the functionality described herein. The systems 102, 104, and 142 can each execute and/or implement various types of computing and network services, such as the data storage and data processing, and/or utilize various computing resources of various types of systems on a permanent or an as-needed basis. Among other types of functionality, the computing resources utilized and/or implemented by the systems 102, 104, and 142, or by a larger system of which one or more of these systems may be a part, can be utilized to implement the various autocompletion candidate determination operations and model training operations described herein. One or more of the systems 102, 104, and 142 may be part of a larger system that provides additional computing resources that include, without limitation, data storage resources, data processing resources, such as virtual machine (VM) instances, networking resources, data communication resources, network services, and other types of resources.

Each type of computing resource utilized and/or implemented at the systems 102, 104, and 142, or by a larger system of which one or more of these systems may be a part, can be general-purpose or can be available in a number of specific configurations. For example, data processing resources can be implemented as physical computers or VM instances in a number of different configurations. The VM instances can be configured to execute applications, including web servers, application servers, media servers, database servers, some or all of the autocompletion candidate determination operations and/or model training operations described above, and/or other types of programs. Data storage resources can include file storage devices, block storage devices, and the like. The systems 102, 104, and 142, or a larger system of which one or more of these systems may be a part, can also be configured to perform other types of operations and/or utilize and/or implement other computing resources not mentioned specifically herein.

The computing resources utilized and/or implement by systems 102, 104, and 142, or a larger system of which one or more of these systems may be a part, may be enabled in one implementation by one or more data centers 800(1), 800(2), 800(3), . . . , 800N) that may be configured in (partially or wholly) and/or communicative connected to the environment 100. The data centers are facilities utilized to house and operate computer systems and associated components. The data centers typically include redundant and backup power, communications, cooling, and security systems. The data centers can also be located in geographically disparate locations. One illustrative configuration for a data center that can be utilized to implement the technologies disclosed herein will be described below with regard to FIG. 9.

The users of the system can access the computing resources, such as systems 102, 104, and 142, and/or any of the computing resources in the environment 100, provided by the system over a network 802, which can be a wide area communication network ("WAN"), such as the Internet, an intranet, an Internet service provider ("ISP") network, or a combination of such networks. For example, and without limitation, a computing device (e.g., the search autocompletion system 104) operated by a user of the system can be utilized to access the system by way of the network 802. It should be appreciated that a local-area network ("LAN"), the Internet, or any other networking topology known in the art that connects the data centers to remote users and other users can be utilized. It should also be appreciated that combinations of such networks can also be utilized.

Figure 9:
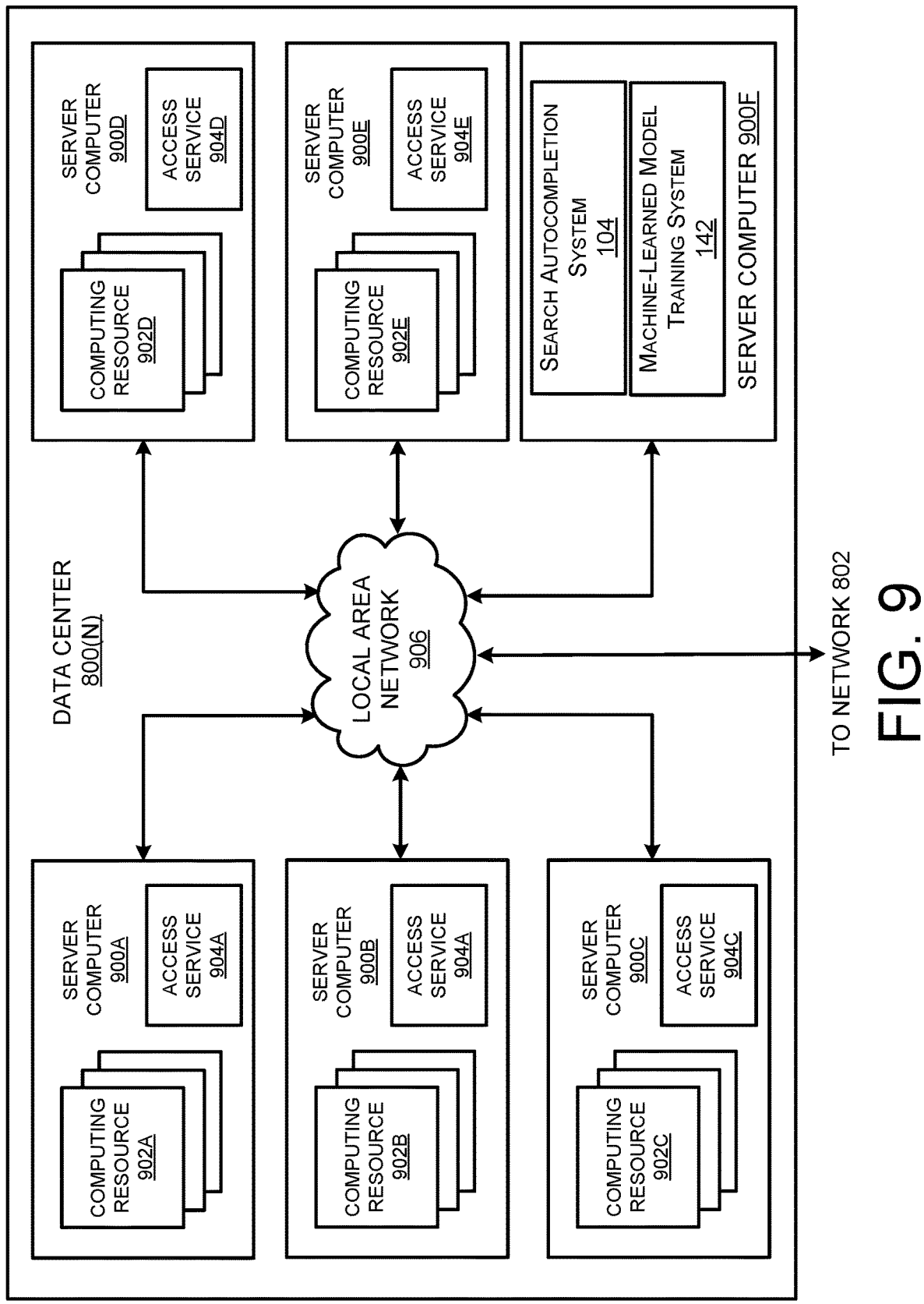
FIG. 9 is a computing system diagram illustrating a configuration for a data center that can be utilized to implement aspects of the technologies disclosed herein.

FIG. 9 is a computing system diagram that illustrates one configuration for a data center 800(N) that can be utilized to implement the systems 104 and 142, as described above in FIGS. 1-7 and/or any other search autocompletion and/or model training system disclosed herein. The example data center 800(N) shown in FIG. 9 includes several server computers 900A-900E (collectively 900) for providing the computing resources 902A-902E (collectively 902), respectively.

The server computers 900 can be standard tower, rack-mount, or blade server computers configured appropriately for providing the various computing resources described herein (illustrated in FIG. 9 as the computing resources 902A-902E). As mentioned above, the computing resources 902 may be utilized and/or configured at one or more of systems 102, 104, and 142, or a larger system of which these systems may be a part, and can include, without limitation, analytics applications, data storage resources, data processing resources such as VM instances or hardware computing systems, database resources, networking resources, model execution resources, model training resources, and others. Some of the servers 900 can also be configured to execute access services 904A-904E (collectively 904) capable of instantiating, providing and/or managing the computing resources 902, some of which are described in detail herein.

The data center 800(N) shown in FIG. 9 also includes a server computer 900F that can execute some or all of the software components described above. For example, and without limitation, the server computer 900F can be configured to execute one or more of the systems 104 and 142 and/or one or more components associated therewith. The server computer 900F can also be configured to execute other components and/or to store data for providing some or all of the functionality described herein. In this regard, it should be appreciated that components or different instances of one or more of the systems 104 and 142 can execute on many other physical or virtual servers in the data centers 800 in various configurations.

In the example data center 800(N) shown in FIG. 9, an appropriate LAN 906 is also utilized to interconnect the server computers 900A-900F. The LAN 906 is also connected to the network 802 illustrated in FIG. 8. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 800(1)-(N), between each of the server computers 900A-900F in each data center 800, and, potentially, between computing resources 902 in each of the data centers 800. It should be appreciated that the configuration of the data center 800 described with reference to FIG. 9 is merely illustrative and that other implementations can be utilized.

Figure 10:
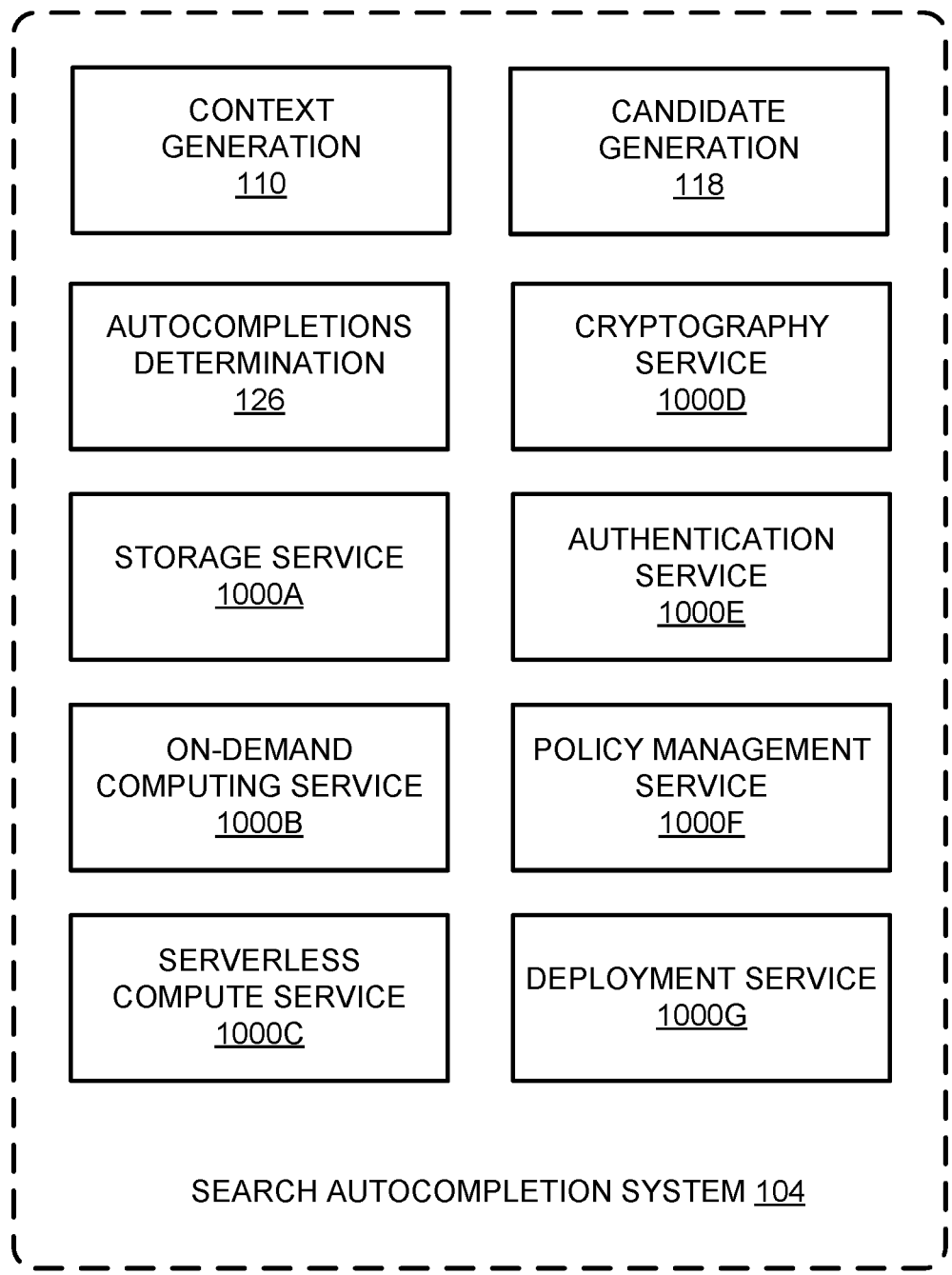
FIG. 10 is a network services diagram that shows aspects of several services that can be provided by and utilized within a system, or a larger system of which the system is a part, which is configured to implement the various technologies disclosed herein.

FIG. 10 is a system services diagram that shows aspects of several services that can be provided by and utilized within the search autocompletion system 104 and/or a larger system of which this system may be a part, which is configured to implement the various technologies disclosed herein. In particular, and as discussed above, this system, or a larger system of which this system may be a part, can provide a variety of services to users and other users including, but not limited to, autocompletion candidate determination services performed by a context generation component 110, a candidate generation component 118, an autocompletions determination component 126, and/or one or more computing instances performing one or more functions thereof; a storage service 1000A; an on-demand computing service 1000B; a serverless compute service 1000C; a cryptography service 1000D; an authentication service 1000E; a policy management service 1000F; and a deployment service 1000G. The system, or a larger system of which the system is a part, can also provide other types of computing services, some of which are described below.

It is also noted that not all configurations described include the services shown in FIG. 10 and that additional services can be provided in addition to, or as an alternative to, the services explicitly described herein. Each of the systems and services shown in FIG. 10 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other.

Additional details regarding some of the services shown in FIG. 10 will now be provided.

The storage service 1000A can be a network-based storage service that stores data obtained from users of the system and/or from computing resources in the system, or a larger system of which the system is a part. The data stored by the storage service 1000A can be obtained from computing devices of users. The data stored by the storage service 1000A may also be activity data logged to the storage system 1000A that may be functioning as a logging system or service.

The on-demand computing service 1000B can be a collection of computing resources configured to instantiate VM instances and to provide other types of computing resources on demand. For example, a user of the system, or a larger system of which the system is a part, can interact with the on-demand computing service 1000B (via appropriately configured and authenticated API calls, for example) to provision and operate VM instances that are instantiated on physical computing devices hosted and operated by the system, or a larger system of which the system is a part. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 1000B is shown in FIG. 10, any other computer system or computer system service can be utilized in the system, or a larger system of which the system is a part, to implement the functionality disclosed herein, such as a computer system or computer system service that does not employ virtualization and instead provisions computing resources on dedicated or shared computers/servers and/or other physical devices.

The serverless compute service 1000C is a network service that allows users to execute code (which might be referred to herein as a "function") without provisioning or managing server computers in the system, or a larger system of which the system is a part. Rather, the serverless compute service 1000C can automatically run code in response to the occurrence of events. The code that is executed can be stored by the storage service 1000A or in another network accessible location.

In this regard, it is to be appreciated that the term "serverless compute service" as used herein is not intended to infer that servers are not utilized to execute the program code, but rather that the serverless compute service 1000C enables code to be executed without requiring a user to provision or manage server computers. The serverless compute service 1000C executes program code only when needed, and only utilizes the resources necessary to execute the code. In some configurations, the user or entity requesting execution of the code might be charged only for the amount of time required for each execution of their program code.

The system, or a larger system of which the system is a part, can also include a cryptography service 1000D. The cryptography service 1000D can utilize storage services of the system, or a larger system of which the system is a part, such as the storage service 1000A, to store encryption keys in encrypted form, whereby the keys can be usable to decrypt user keys accessible only to particular devices of the cryptography service 1000D. The cryptography service 1000D can also provide other types of functionality not specifically mentioned herein.

The system, or a larger system of which the system is a part, in various configurations, also includes an authentication service 1000E and a policy management service 1000F. The authentication service 1000E, in one example, is a computer system (i.e., collection of computing resources 1000B) configured to perform operations involved in authentication of users or customers. For instance, one of the services shown in FIG. 10 can provide information from a user or customer to the authentication service 1000E to receive information in return that indicates whether or not the requests submitted by the user or the customer are authentic.

The policy management service 1000F, in one example, is a network service configured to manage policies on behalf of users or customers of the system, or a larger system of which the system is a part. The policy management service 1000F can include an interface (e.g., API or GUI) that enables customers to submit requests related to the management of policy, such as a security policy. Such requests can, for instance, be requests to add, delete, change, or otherwise modify policy for a customer, service, or system, or for other administrative actions, such as providing an inventory of existing policies and the like.

The system, or a larger system of which the system is a part, can additionally maintain other network services based, at least in part, on the needs of its customers. For instance, the system, or a larger system of which the system is a part, can maintain a deployment service 1000G for deploying program code in some configurations. The deployment service 1000G provides functionality for deploying program code, such as to virtual or physical hosts provided by the on-demand computing service 1000B. Other services include, but are not limited to, database services, object-level archival data storage services, and services that manage, monitor, interact with, or support other services. The system, or a larger system of which the system is a part, can also be configured with other network services not specifically mentioned herein in other configurations.

Figure 11:
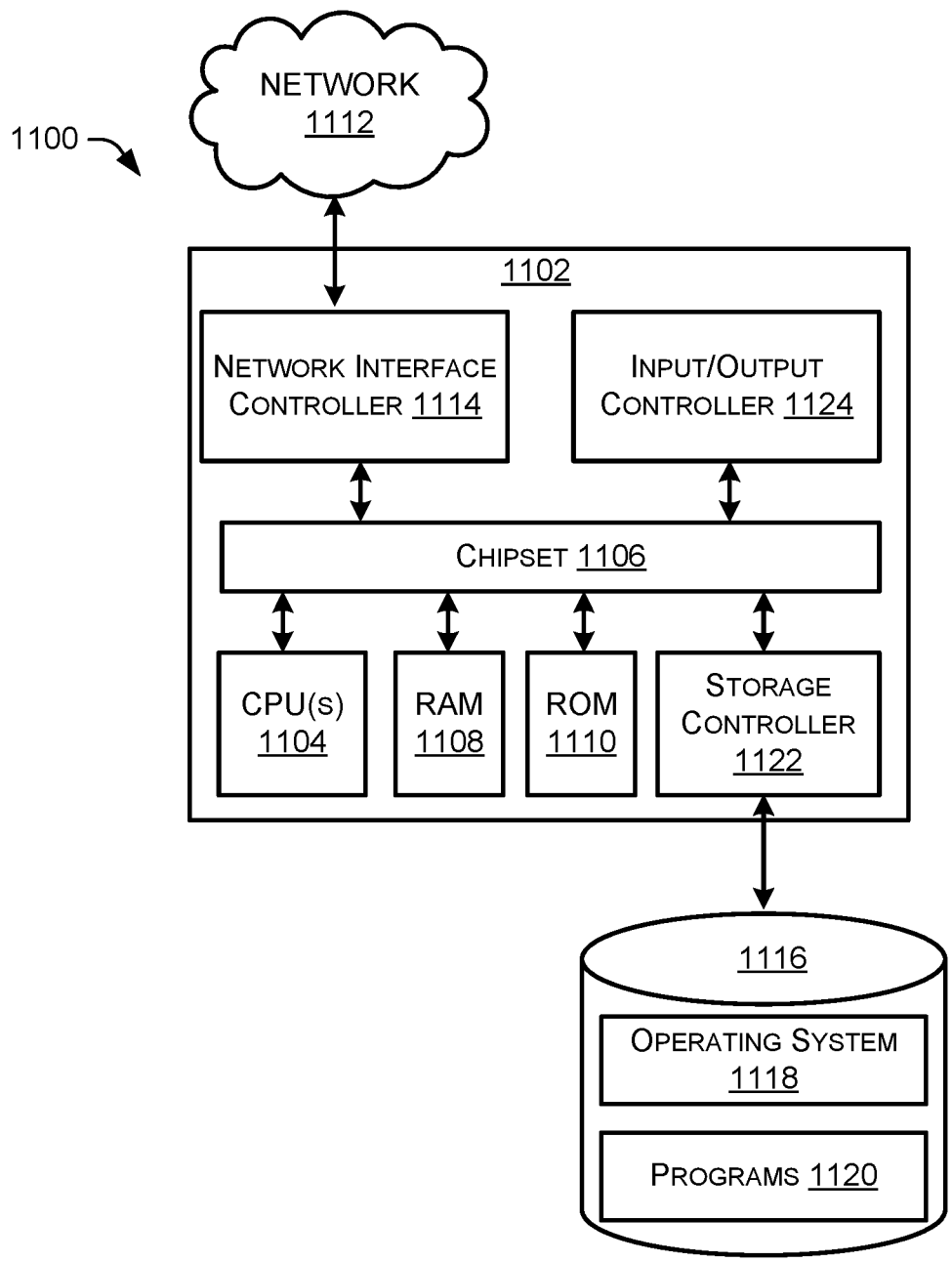
FIG. 11 is a computer architecture diagram showing an illustrative computer hardware architecture for implementing a computing device that can be utilized to implement aspects of the various technologies presented herein.

FIG. 11 shows an example computer architecture for a computer 1100 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein. The computer 1100 may represent architecture for a PII detection system, a model training system, and/or other systems and components described herein.

The computer 1100 includes a baseboard 1102, or "motherboard," which may be one or more printed circuit boards to which a multitude of components and/or devices may be connected by way of a system bus and/or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network, such as the network 1112. The chipset 1106 can include functionality for providing network connectivity through a NIC 1114, such as a gigabit Ethernet adapter. The NIC 1114 is capable of connecting the computer 1100 to other computing devices over the network 1112. It should be appreciated that multiple NICs 1114 can be present in the computer 1100, connecting the computer to other types of networks and remote computer systems.

The computer 1100 can be connected to a mass storage device 1116 that provides non-volatile storage for the computer. The mass storage device 1116 can store an operating system 1118, programs 1120, and data, which have been described in greater detail herein. The mass storage device 1116 can be connected to the computer 1100 through a storage controller 1122 connected to the chipset 1106. The mass storage device 1116 can consist of one or more physical storage units. The storage controller 1122 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 can store data on the mass storage device 1116 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1116 is characterized as primary or secondary storage, and the like.

For example, the computer 1100 can store information to the mass storage device 1116 by issuing instructions through the storage controller 1122 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the mass storage device 1116 by detecting the physical states or characteristics of one or more particular locations within the physical storage units.

In addition to the mass storage device 1116 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned above, the mass storage device 1116 can store an operating system 1118 utilized to control the operation of the computer 1100. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1116 can store other system or application programs and data utilized by the computer 1100.

In one configuration, the mass storage device 1116 or other computer-readable storage media is encoded with computer-executable instructions which, when loaded into the computer 1100, transform the computer from a general-purpose computing system into a special-purpose computer capable of implementing the configurations described herein. These computer-executable instructions transform the computer 1100 by specifying how the CPUs 1104 transition between states, as described above. According to one configuration, the computer 1100 has access to computer-readable storage media storing computer-executable instructions which, when executed by the computer 1100, perform the various processes described above. The computer 1100 can also include computer-readable storage media for performing any of the other computer-implemented operations described herein.

The computer 1100 can also include one or more input/output controllers 1124 for receiving and processing input from a number of input devices, such as a keyboard, a mouse, a touchpad, a touch screen, an electronic stylus, or other type of input device. Similarly, an input/output controller 1124 can provide output to a display, such as a computer monitor, a flat-panel display, a digital projector, a printer, or other type of output device. It will be appreciated that the computer 1100 might not include all of the components shown in FIG. 11, can include other components that are not explicitly shown in FIG. 11, or can utilize an architecture completely different than that shown in FIG. 11.

Based on the foregoing, it should be appreciated that technologies for determining, scoring, and ranking autocompletion candidates and presenting such candidates as autocompletion suggestions to a user have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A method comprising:
   receiving, at a search autocompletion system from a search application, input data comprising one or more characters representing a prefix and user identification data;
   determining, by the search autocompletion system, a knowledge graph representing a target search space;
   determining, by the search autocompletion system, first autocompletion candidate data representing first correspondences between the prefix and nodes in the knowledge graph;
   determining, by the search autocompletion system, historical query data representing queries submitted to the search application by a plurality of users;
   determining, by the search autocompletion system, second autocompletion candidate data representing second correspondences between the prefix and the historical query data;
   determining, by the search autocompletion system and based on the user identification data, historical interaction data associated with a user;
   determining, by the search autocompletion system, third autocompletion candidate data representing third correspondences between the prefix and the historical interaction data;
   executing, by the search autocompletion system and using the first autocompletion candidate data, the second autocompletion candidate data, and the third autocompletion candidate data as input, a machine-learned autocompletion candidate determination model to:
     execute a graph neural network using, as graph neural network input, a first subset of the first autocompletion candidate data, the second autocompletion candidate data, and the third autocompletion candidate data and language model output generated by a language model to generate first feature output;
     execute the language model using, as language model input, a second subset of the first autocompletion candidate data, the second autocompletion candidate data, and the third autocompletion candidate data and graph neural network output generated by the graph neural network to generate second feature output;
     determine, based on the first feature output and the second feature output, scores for individual candidates represented in at least one of the first autocompletion candidate data, the second autocompletion candidate data, or the third autocompletion candidate data; and determine, based on the scores for the individual candidates, an ordered set of autocompletion candidates; and transmitting, by the search autocompletion system to the search application for presentation to a user, the ordered set of autocompletion candidates.

2. The method of claim 1, wherein the scores determined further based on one or more embeddings associated with the prefix and determined by using a second language model.

3. The method of claim 1 wherein determining the scores for the individual candidates comprises providing first feature output and the second feature output to a multilayer perceptron to generate the scores for the individual candidates as score output.

4. A method comprising:
receiving, at a search autocompletion system from a search application, prefix data comprising one or more characters representing a prefix;
determining, by the search autocompletion system, autocompletion candidate data representing:
one or more first correspondences between the prefix and one or more nodes in a knowledge graph representing a target search space;
one or more second correspondences between the prefix and historical query data; and
one or more third correspondences between the prefix and user historical interaction data;
executing, by the search autocompletion system and using the autocompletion candidate data as input, a machine-learned autocompletion candidate determination model to:
execute a graph neural network using, as first input, a first subset of the autocompletion candidate data comprising a first subset of the one or more first correspondences, a first subset of the one or more second correspondences, a first subset of the one or more third correspondences, and second input generated by a language model to generate first feature output;
execute the language model using, as second input, a second subset of the autocompletion candidate data comprising a second subset of the one or more first correspondences, a second subset of the one or more second correspondences, a second subset of the one or more third correspondences, and third input generated by the graph neural network to generate second feature output;
determine, based at least in part on the first feature output and the second feature output, scores for individual candidates represented in at least one of the one or more first correspondences, the one or more second correspondences, or the one or more third correspondences; and
determine, based at least in part on the scores for the individual candidates, an ordered set of autocompletion candidates; and
transmitting, by the search autocompletion system to the search application for presentation to a user, the ordered set of autocompletion candidates.

5. The method of claim 4, wherein the historical query data comprises a plurality of search queries received over a time period from a plurality of users of the search application.

6. The method of claim 4, wherein the machine-learned autocompletion candidate determination model is further executed to determine the scores for the individual candidates further based at least in part on one or more embeddings associated with the individual candidates.

7. The method of claim 4, wherein determining the one or more first correspondences comprises determining at least one of an exact match or a semantic match between the prefix and data associated with the one or more nodes in the knowledge graph.

8. The method of claim 7, wherein the data associated with the one or more nodes in the knowledge graph comprises at least one of node content or node metadata.

9. The method of claim 4, wherein determining the autocompletion candidate data further comprises:
determining one or more fourth correspondences between the one or more first correspondences and user historical interaction data; and
determining the autocompletion candidate data further based at least in part on the one or more fourth correspondences.

10. The method of claim 4, wherein the machine-learned autocompletion candidate determination model is further executed to determine the scores for the individual candidates further based at least in part on one or more embeddings associated with the prefix.

11. The method of claim 4, wherein
the user historical interaction data comprises one or more of:
historical user search query data;
historical user content consumption data; or
user preferences.

12. The method of claim 4, wherein the machine-learned autocompletion candidate determination model is executed to determine the scores for the individual candidates using multilayer perceptron.

13. The method of claim 12, wherein the machine-learned autocompletion candidate determination model is executed to determine the scores for the individual candidates by providing the first feature output and the second feature output as input to the multilayer perceptron.

14. A system comprising:
one or more processors; and
one or more computer-readable media storing computer-executable instructions that, when executed by the one or more processors, cause a search autocompletion system to perform operations comprising:
receiving a prefix and user identification data from a search application;
determining autocompletion candidate data representing:
a first correspondence between the prefix and a node in a knowledge graph representing a target search space;
a second correspondence between the prefix and historical query data; and
a third correspondence between the prefix and user historical interaction data;
executing a machine-learned autocompletion candidate determination model using the autocompletion candidate data as input to:
execute a graph neural network using, as input, the first correspondence, the second correspondence, the third correspondence, and second input generated by a language model to generate first feature output;

execute the language model using, as input, the first correspondence, the second correspondence, the third correspondence, and second input generated by the graph neural network to generate second feature output; and determine, based at least in part on the first feature output and the second feature output, a score for an autocompletion candidate represented in at least one of the first correspondence, the second correspondence, or the third correspondence; and transmitting the autocompletion candidate to the search application for presentation to a user.

15. The system of claim 14, wherein the user historical interaction data comprises one or more of:

historical user search query data;

historical user content consumption data; or user preferences.

16. The system of claim 14, wherein the machine-learned autocompletion candidate determination model is further executed to determine the score based at least in part on one or more embeddings associated with the autocompletion candidate.

17. The system of claim 14, wherein the operations further comprise:

determining a second node in the knowledge graph that is linked to the node; and determining one or more autocompletion candidates based at least in part on the second node.

18. The system of claim 14, wherein the machine-learned autocompletion candidate determination model is further executed to:

determine one or more embeddings associated with the prefix using a second language model; and determine the score for the autocompletion candidate further based at least in part on the one or more embeddings.

19. The system of claim 14, wherein the machine-learned autocompletion candidate determination model is further executed to determine the score for the autocompletion candidate using a multilayer perceptron based at least in part on the first feature output and the second feature output.

20. The system of claim 14, wherein the operations further comprise receiving the machine-learned autocompletion candidate determination model from a machine-learned model training system configured to train the machine-learned autocompletion candidate determination model using training data comprising a plurality of autocompletion candidates and a corresponding plurality of features.

\* \* \* \* \*